United States Patent
Knutson et al.

(10) Patent No.: US 10,831,173 B2
(45) Date of Patent: Nov. 10, 2020

(54) TOOL HAVING MAGNETIC MATERIAL

(71) Applicant: The Boeing Company, Chicago (IL)

(72) Inventors: Samuel James Knutson, Charleston, SC (US); Raviendra Sidath Suriyaarachchi, Daniel Island, SC (US); Dennis R. Mathis, Charleston, SC (US)

(73) Assignee: The Boeing Company, Chicago, IL (US)

( * ) Notice: Subject to any disclaimer, the term of this patent is extended or adjusted under 35 U.S.C. 154(b) by 194 days.

(21) Appl. No.: 15/675,252

(22) Filed: Aug. 11, 2017

(65) Prior Publication Data

US 2019/0049919 A1 Feb. 14, 2019

(51) Int. Cl.
G05B 19/19 (2006.01)
G05B 19/402 (2006.01)

(52) U.S. Cl.
CPC .......... G05B 19/19 (2013.01); G05B 19/402 (2013.01); *G05B 2219/37124* (2013.01); *G05B 2219/37338* (2013.01); *G05B 2219/43134* (2013.01); *G05B 2219/50107* (2013.01)

(58) Field of Classification Search
CPC ................ G05B 19/19; G05B 2219/37; G05B 2219/43; G05B 2219/50

USPC ......................................................... 700/159
See application file for complete search history.

(56) References Cited

U.S. PATENT DOCUMENTS

| | | | |
|---|---|---|---|
| 4,898,636 A | 2/1990 | Rigling et al. | |
| 2010/0191360 A1* | 7/2010 | Napadensky | G06T 17/00 700/98 |
| 2013/0015292 A1* | 1/2013 | Zielinski | B32B 5/02 244/1 A |
| 2014/0214184 A1* | 7/2014 | Freeman | B25J 9/1615 700/60 |
| 2015/0090392 A1* | 4/2015 | Bertrand | B32B 43/00 156/64 |
| 2015/0286211 A1* | 10/2015 | Sticht | G05B 19/4182 700/258 |
| 2016/0271696 A1* | 9/2016 | Kamakura | B22F 3/1055 |
| 2017/0001258 A1* | 1/2017 | Hildebrand | B23K 26/0093 |
| 2017/0266878 A1* | 9/2017 | Furukawa | B33Y 50/02 |
| 2018/0284719 A1* | 10/2018 | Lever | B23Q 17/22 |

* cited by examiner

Primary Examiner — Md Azad
(74) Attorney, Agent, or Firm — Yee & Associates, P.C.

(57) ABSTRACT

A method is presented. A machine head is positioned in a desired location relative to a material on a tool using a sensor connected to the machine head and calibrated to detect magnetic material in the tool. An operation is performed on the material using the machine head starting at the desired location.

33 Claims, 20 Drawing Sheets

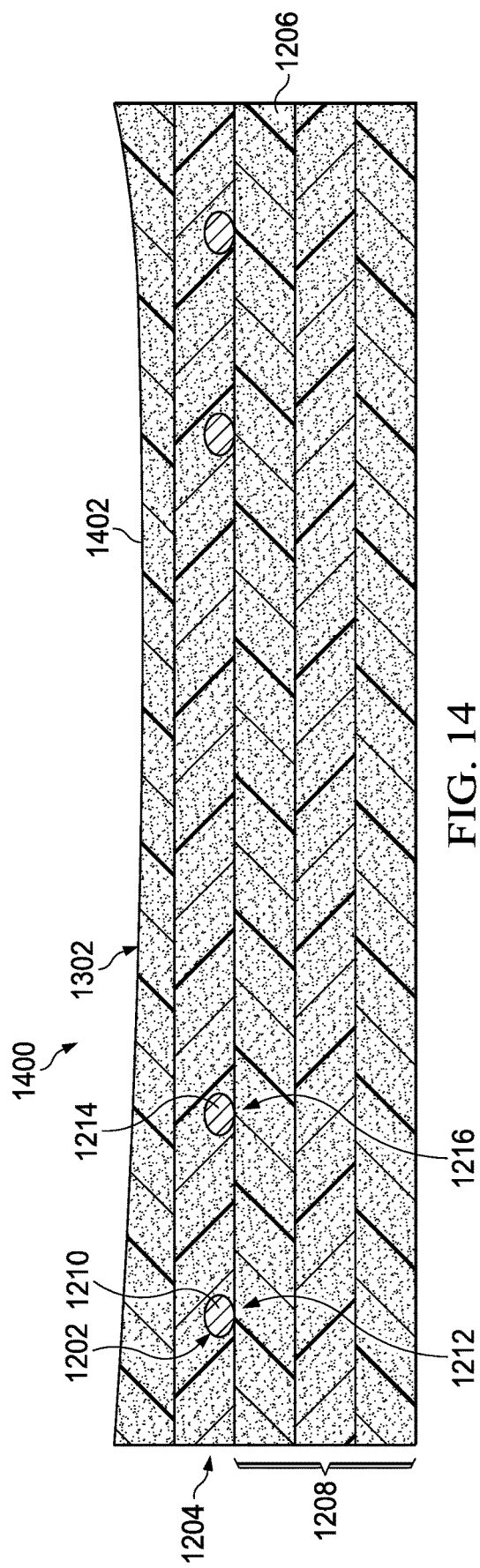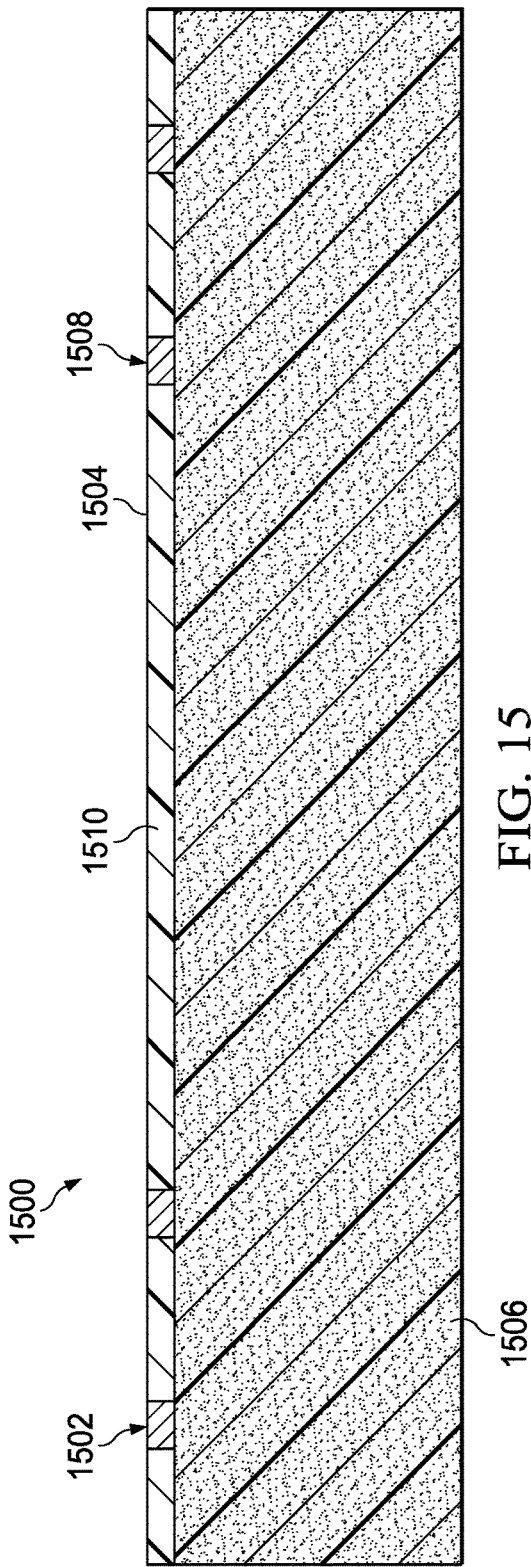

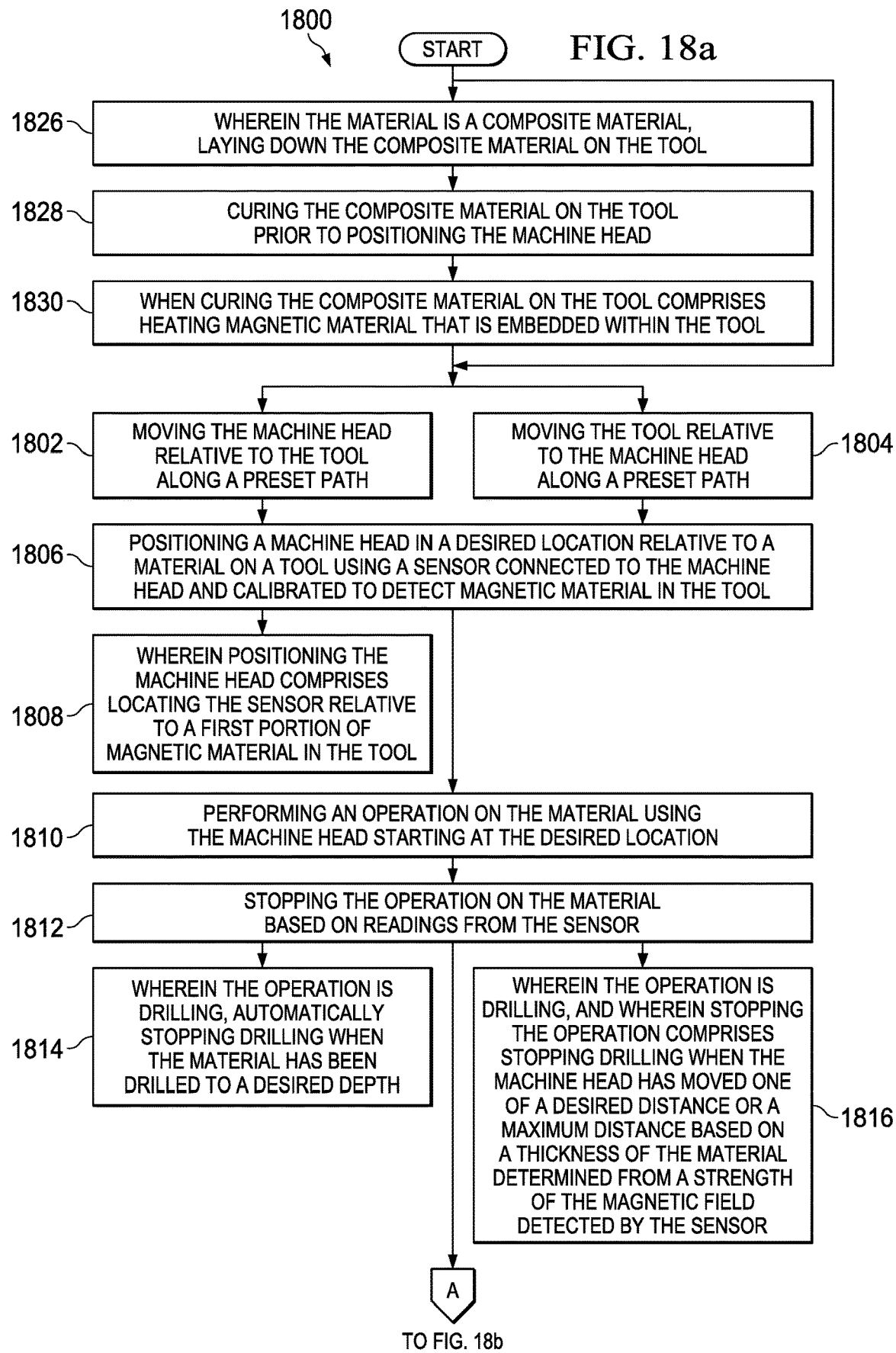

TOOL HAVING MAGNETIC MATERIAL

BACKGROUND INFORMATION

1. Field

The present disclosure relates generally to performing manufacturing operations, and more specifically, to performing manufacturing operations that conventionally use registration steps. Still more particularly, the present disclosure relates to positioning a machine head for performing an operation on a material using magnetic material in a tool below the material.

2. Background

Locational accuracy of manufacturing operations affects the quality of the resulting structures. Reference features on a material allow for accurate location of manufacturing operations on the material. Some structures, such as aircraft structures, have tightly controlled surface flatness standards. Surface flatness standards of the material of these structures do not provide reference features on the surface.

Computer numerical controlled (CNC) systems may control manufacturing operations. Computer numerically controlled (CNC) systems include complex programs. The complex programs include detailed movement and manufacturing operation instructions. The complex programs begin based on reference features of the material or reference features on a tool.

Performing manufacturing operations using a computer numerically controlled (CNC) system may produce offsets due to tooling variations. To validate tool accuracy, material and tool verifications may be performed. The validations may be used to perform manufacturing operations in accurate locations. Increasing validation steps also increases manufacturing time.

One manufacturing operation with a high desired accuracy is drilling. In addition to tooling placement variations, variations may be present in the thickness of a material to be drilled. Thickness variations may result in over drill conditions leading to undesirable drilling in the material or tool.

Therefore, it would be desirable to have a method and apparatus that take into account at least some of the issues discussed above, as well as other possible issues. For example, it would be desirable to accurately locate machine heads to material without reference features on the surface. It would also be desirable to reduce manufacturing time. Likewise, it would be desirable to reduce or prevent over drill conditions.

SUMMARY

An illustrative embodiment of the present disclosure provides a method. A machine head is positioned in a desired location relative to a material on a tool using a sensor connected to the machine head and calibrated to detect magnetic material in the tool. An operation is performed on the material using the machine head starting at the desired location.

Another illustrative embodiment of the present disclosure provides a method. A sensor, attached to a machine head, is calibrated to detect magnetic fields. The machine head is moved relative to a tool comprising a magnetic material. The machine head is stopped at a desired location when the sensor detects a magnetic field in the tool. A manufacturing operation is performed on a part on the tool using the machine head starting from the desired location.

A further illustrative embodiment of the present disclosure provides a method. A first material is laid down to form a tool base. Magnetic material is positioned at a number of locations on the tool base. The magnetic material is encompassed to form a tool.

A yet further illustrative embodiment of the present disclosure provides a tool configured to locate a number of operations on a material. The tool comprises a layup surface and magnetic material. The layup surface is configured to mate with the material. The magnetic material is positioned at a number of locations in the tool corresponding to a number of locations for performance of the number of operations on material.

Another illustrative embodiment of the present disclosure provides a system. The system comprises a machine head and a sensor. The machine head is configured to perform an operation on a material on a tool using an operational component. The sensor is connected to the machine head and calibrated to detect magnetic material in the tool beneath the material.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 14 is an illustration of a tool with magnetic material in accordance with an illustrative embodiment;

FIG. 15 is an illustration of a tool with magnetic material in accordance with an illustrative embodiment;

FIGS. 18A and 18B are illustrations of a flowchart of a method for locating a machine head relative to a tool and performing a number of manufacturing operations in accordance with an illustrative embodiment;

DETAILED DESCRIPTION

The illustrative embodiments recognize and take into account one or more different considerations. For example, the illustrative embodiments recognize and take into account that certain magnetic materials with Curie Temperatures over 350° F., such as $Nd_2Fe_{14}B$, are resistant to losing their magnetism up to 590° F., which is well above curing temperatures during composite cure processing. The illustrative embodiments recognize and take into account that with Nedymium magnets having some of the highest remanence properties in rare earth magnets (1-1.3T), these magnets would exert a force through composite material that would be detected by a sensor.

The illustrative embodiments recognize and take into account that a magnetic field can be detected using any desirable method. The illustrative embodiments recognize and take into account that the Hall Effect can be utilized to locate a magnetic field. The illustrative embodiments recognize and take into account that the Hall Effect will locate the current of the magnet. The illustrative embodiments recognize and take into account that magnets can be used to provide a locational reference for a machine head with accuracy of the magnetic location.

Figure 1:
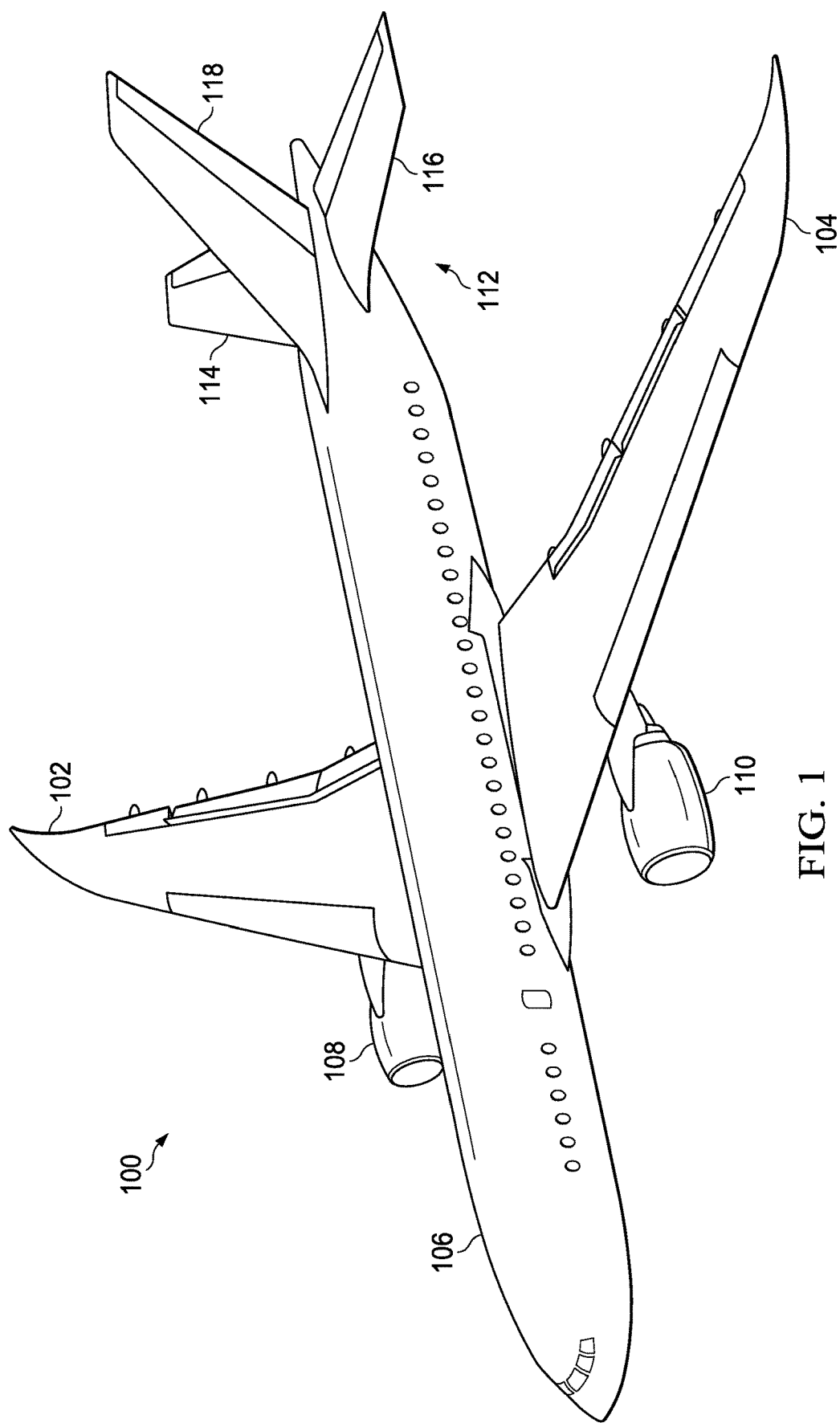
FIG. 1 is an illustration of an aircraft in which an illustrative embodiment may be implemented.

Referring now to the figures, and in particular, with reference to FIG. 1, an illustration of an aircraft is depicted in which an illustrative embodiment may be implemented. In this illustrative example, aircraft 100 has first wing 102 and second wing 104 connected to body 106. Aircraft 100 includes engine 108 connected to first wing 102 and engine 110 connected to second wing 104.

Body 106 has tail section 112. First horizontal stabilizer 114, second horizontal stabilizer 116, and vertical stabilizer 118 are connected to tail section 112 of body 106.

Manufacturing operations may be located and performed on components of aircraft 100 using a tool having magnetic material. For example, a composite skin of at least one of body 106, first wing 102, or second wing 104, may be manufactured using a tool having magnetic material. As another example, manufacturing operations may be located and performed using a tool having magnetic material on a cover for engine 108, cover for engine 110, tail section 112, first horizontal stabilizer 114, second horizontal stabilizer 116, or vertical stabilizer 118.

This illustration of aircraft 100 is provided for the purposes of illustrating one environment in which different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, rotorcraft, or other suitable types of aircraft.

Although the illustrative examples for an illustrative embodiment are described with respect to an aircraft, the illustrative embodiments may be applied to other types of structures. The structure may be, for example, a mobile structure, a stationary structure, a land-based structure, an aquatic-based structure, or a space-based structure. More specifically, the structure may be a surface ship, a tank, a personnel carrier, a train, a spacecraft, a space station, a satellite, a submarine, a manufacturing facility, a building, or other suitable types of structures.

Figure 2:
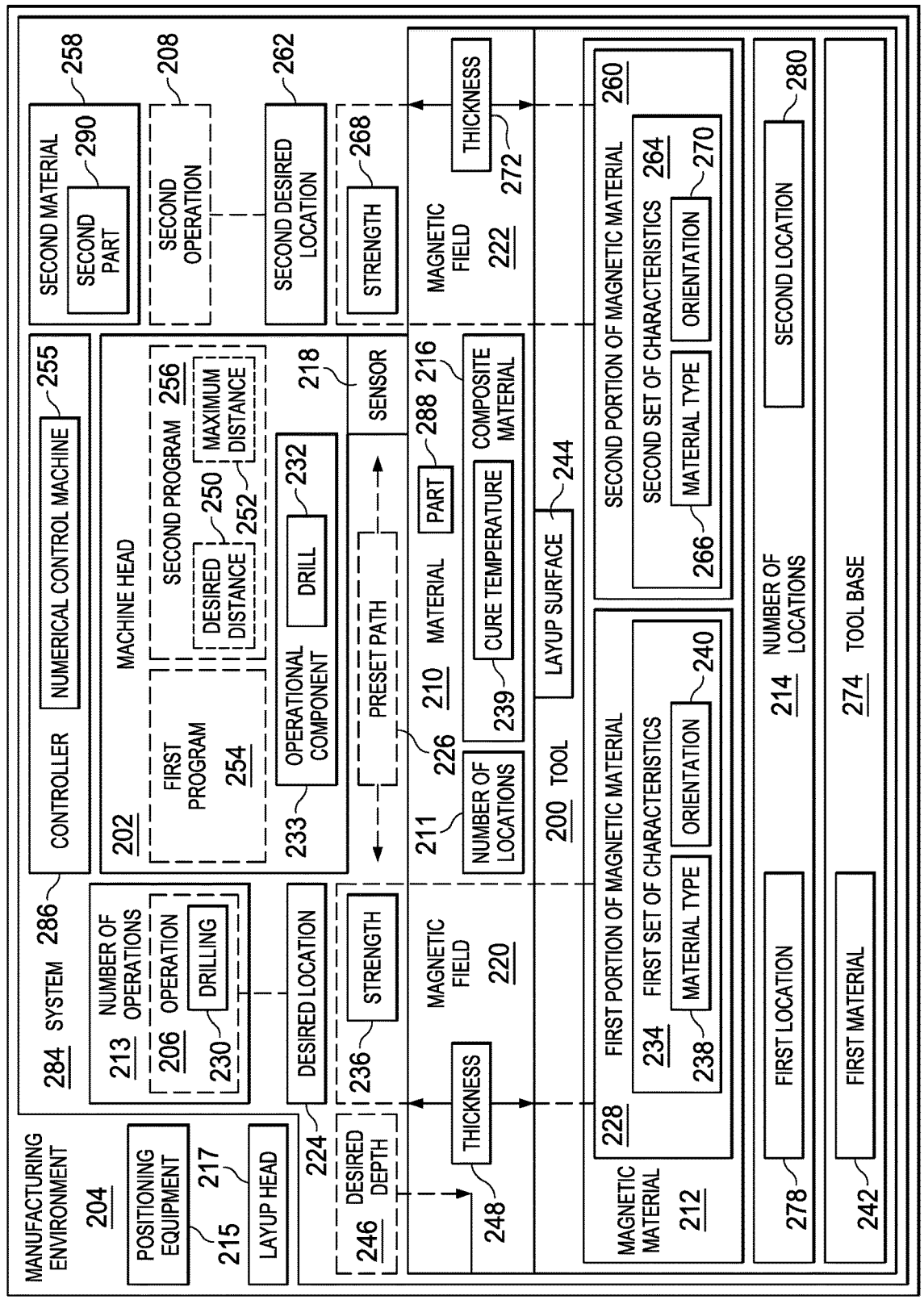
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Tool 200 and machine head 202 are present within manufacturing environment 204. Tool 200 and machine head 202 are used to perform a number of manufacturing operations, such as operation 206 or second operation 208, on material 210 on tool 200. As used herein, a "number of" means one or more. Thus, a number of manufacturing operations is one or more manufacturing operations.

A portion of aircraft 100, shown in FIG. 1, may receive a number of manufacturing operations, such as operation 206 or second operation 208, in manufacturing environment 204. In some illustrative examples, material 210 forms a portion of aircraft 100.

Tool 200 is used to locate machine head 202 relative to material 210. Tool 200 includes magnetic material 212. Magnetic material 212 is positioned at number of locations 214 in tool 200. Number of locations 214 corresponds to number of locations 211 for performance of number of operations 213 on material 210.

Number of operations 213 takes the form of any desirable type of operation. Number of operations 213 may also be referred to as "manufacturing operations." Thus, operation 206 may be referred to as a manufacturing operation (e.g., a first manufacturing operation). Likewise, second operation 208 may be referred to as a manufacturing operation (e.g., a second manufacturing operation).

Number of operations 213 includes any desirable actions. In some illustrative examples, number of operations may be layup of composite material 216, inspection, surface treatment, milling, drilling, or any other desirable actions.

In some illustrative examples, number of locations 214 is directly below number of locations 211 of material 210 to receive number of operations 213. In other illustrative examples, number of locations 214 is offset from number of locations 211 of material 210 to receive number of operations 213.

By tool 200 having magnetic material 212, a reference or registration step for machine head 202 relative to material 210 may be eliminated. By tool 200 having magnetic material 212, registration steps for tool 200 relative to any material on tool 200 may be eliminated. Magnetic material 212 of tool 200 reduces manufacturing time by reducing a number of manufacturing steps.

In some illustrative examples, material 210 is indexed to tool 200. In these illustrative examples, material 210 is placed onto tool 200. In these illustrative examples, positioning equipment 215 is registered relative to tool 200 prior to positioning material 210 on tool 200.

In some illustrative examples, material 210 is composite material 216. In some examples when material 210 is composite material 216, composite material 216 may be laid up on tool 200. In these illustrative examples, layup head 217 for laying up composite material 216 is registered relative to tool 200 prior to laying up composite material 216.

Layup head 217 may be registered relative to tool 200 using any desirable method. In some illustrative examples, layup head 217 may be registered using visual sensors. In some other illustrative examples, layup head 217 may be registered using magnetic material 212.

In other illustrative examples, tool 200 is positioned relative to material 210. In these illustrative examples, tool 200 is moved to secure tool 200 to material 210. In these illustrative examples, positioning equipment 215 is referenced relative to tool 200 prior to moving tool 200 to material 210.

After securing material 210 to tool 200, material 210 and tool 200 have been positioned relative to each other to a desirable level of accuracy. Relative positions of material 210 and tool 200 may be confirmed using any desirable methods.

Sensor 218 is connected to machine head 202. Sensor 218 is calibrated to detect magnetic material 212 in tool 200. Sensor 218 is calibrated to detect magnetic fields, such as magnetic field 220 and magnetic field 222 of magnetic material 212.

Machine head 202 is positioned in desired location 224 relative to material 210 on tool 200 using sensor 218 connected to machine head 202 and calibrated to detect magnetic material 212 in tool 200. In some illustrative examples, machine head 202 is moved relative to tool 200 along preset path 226. In these illustrative examples, positioning machine head 202 in desired location 224 comprises stopping machine head 202 from moving along preset path 226 in response to sensor 218 detecting magnetic material 212 in tool 200. More specifically, in these illustrative examples, positioning machine head 202 in desired location 224 comprises stopping machine head 202 from moving along preset path 226 in response to sensor 218 detecting first portion of magnetic material 228 in tool 200.

In some illustrative examples, tool 200 is moved relative to machine head 202 along preset path 226. In these illustrative examples, positioning machine head 202 in desired location 224 comprises stopping tool 200 from moving along preset path 226 in response to sensor 218 detecting magnetic material 212 in tool 200. More specifically, in these illustrative examples, positioning machine head 202 in desired location 224 comprises stopping tool 200 from moving along preset path 226 in response to sensor 218 detecting first portion of magnetic material 228 in tool 200.

Operation 206 is performed on material 210 using machine head 202 starting at desired location 224. Operation 206 includes any desirable actions. In some illustrative examples, operation 206 may be layup of composite material 216, inspection, surface treatment, milling, drilling 230, or any other desirable actions. For example, when operation 206 is layup of composite material 216, magnetic material 212 may indicate locations for ply drops or other ply characteristics of composite material 216. As another example, when operations 206 is surface treatment, operations 206 may include at least one of chemical treatment or mechanical treatment such as painting, solvent application, cleaning, coating application, sanding, blasting, or any other desirable type of surface treatment.

In some illustrative examples, machine head 202 starts at desired location 224 and operation 206 includes movement of at least a portion of machine head 202 relative to material 210. For example, when operation 206 comprises drilling 230, at least a portion of machine head 202 is moved towards material 210. For example, when operation 206 comprises drilling 230, drill 232 of machine head 202 moves towards and then away from material 210.

Drill 232 is an example of operational component 233 of machine head 202. Operational component 233 takes any desirable form. Operational component 233 is selected based on type of operation 206. In one illustrative example, when operation 206 comprises applying a liquid coating, operational component 233 takes the form of a sprayer, roller, or brush. In another illustrative example, when operation 206 comprises changing a surface texture, operational component 233 takes the form of an abrasive material.

When operation 206 comprises applying a surface treatment to material 210, machine head 202 moves relative to material 210 to apply the surface treatment. When operation 206 comprises routing, at least a portion of machine head 202 moves relative to material 210 to router material 210. In some illustrative examples, machine head 202 moves relative to desired location 224 to offset sensor 218 from first portion of magnetic material 228 by a set distance.

In some illustrative examples, positioning machine head 202 comprises locating sensor 218 relative to magnetic material 212 in tool 200. In some illustrative examples, positioning machine head 202 comprises locating sensor 218 over magnetic material 212 in tool 200. In some illustrative examples, positioning machine head 202 comprises centering sensor 218 over magnetic material 212 in tool 200. For example, positioning machine head 202 comprises centering sensor 218 over first portion of magnetic material 228 in tool 200.

First portion of magnetic material 228 emits magnetic field 220. First portion of magnetic material 228 has first set of characteristics 234. First set of characteristics 234 affect magnetic field 220. For example, first set of characteristics 234 influences strength 236 of magnetic field 220.

First set of characteristics 234 includes material type 238 and orientation 240. Material type 238 is the type of magnetic material forming first portion of magnetic material 228. In one illustrative example, material type 238 is selected to maintain magnetism above a cure temperature 239 of composite material 216. In another illustrative example, material type 238 is selected to maintain magnetism above a cure temperature of first material 242 of tool 200.

In one illustrative example, material type 238 is selected to produce desired values for strength 236. In another illustrative example, material type 238 is selected based on price or availability. In some illustrative examples, strength 236 is set to designate a desired operation for operation 206.

Orientation 240 is set relative to layup surface 244 of tool 200. In some illustrative examples, orientation 240 is set to designate a desired operation for operation 206.

In some illustrative examples, operation 206 is stopped based on set parameters of operation 206. When operation 206 is drilling 230, desired depth 246 is a parameter of operation 206. In some illustrative examples, when operation 206 is drilling 230, drilling 230 is automatically stopped when material 210 has been drilled to desired depth 246. Desired depth 246 is a thickness value of material 210 to be removed.

In some illustrative examples, operation 206 on material 210 is stopped based on readings from sensor 218. In one illustrative example, strength 236 of magnetic field 220 is detected by sensor 218. Thickness 248 of material 210 in magnetic field 220 is determined using strength 236 of magnetic field 220. Thickness 248 is determined based on first set of characteristics 234 and knowledge of the depth of first portion of magnetic material 228 in tool 200.

Thickness 248 is compared to desired depth 246. When desired depth 246 is greater than thickness 248, drilling 230 would drill into tool 200. When desired depth 246 would drill into tool 200, operation 206 is stopped based on readings from sensor 218. More specifically, when desired depth 246 would drill into tool 200, operation 206 is stopped based on the readings of strength 236 of magnetic field 220 by sensor 218. Readings from sensor 218 are used to stop drilling 230 to prevent drilling 230 into tool 200.

Desired distance 250 is the desired distance of movement of machine head 202 to perform operation 206 as designed. In some illustrative examples, operation 206 is drilling 230, and stopping operation 206 comprises stopping drilling 230 when machine head 202 has moved one of desired distance 250 or maximum distance 252 based on thickness 248 of material 210 determined from strength 236 of magnetic field 220 detected by sensor 218.

Maximum distance 252 is a distance machine head 202 can move without undesirably affecting material 210. For example, when operation 206 is drilling 230, maximum distance 252 is a distance machine head 202 can move without over drilling material 210.

In some illustrative examples, when machine head 202 is moved along preset path 226, preset path 226 is first program 254 for numerical control machine 255. When sensor 218 detects magnetic field 220, first program 254 is stopped and machine head 202 is stopped at desired location 224.

After stopping first program 254, second program 256 may be run. Running second program 256 for numerical control machine 255 controls machine head 202 starting from desired location 224 to perform operation 206.

When machine head 202 is controlled by separate programs, such as first program 254 and second program 256, operation 206 is not tied to a registration of machine head 202 to material 210. For conventional computer numerical control (CNC) programs, an operation is tied to a relative location defined in the program. By having separate programs, such as first program 254 and second program 256, each respective program is simpler than a conventional computer numerical control (CNC) programs.

In some illustrative examples, after performing operation 206, machine head 202 continues using first program 254. In these illustrative examples, second program 256 may be repeated for each location of magnetic material 212. In these illustrative examples, first program 254 and second program 256 combined are shorter than a conventional computer numerical control (CNC) program including multiple instances of operation 206.

In some illustrative examples, first program 254 is used to drive machine head 202 to first portion of magnetic material 228. In these illustrative examples, second program 256 may use first portion of magnetic material 228 as a locational reference. In these illustrative examples, second program 256 may then drive machine head 202 perform number of operations 213, including operation 206. In this illustrative example, operations may be performed on material 210 to portions of material 210 that are not near magnetic material 212. In these illustrative examples, the quantity of portions of magnetic material 212 need not be the same as the quantity of operations to be performed on material 210. In these illustrative examples, second program 256 may be similar to conventional computer numerical control (CNC) programs but uses positional reference utilizing magnetic material 212.

When material 210 is composite material 216, composite material 216 may be laid up on tool 200. In these illustrative examples, composite material 216 is cured on tool 200 prior to positioning machine head 202.

When composite material 216 is cured on tool 200, magnetic material 212 that is embedded within tool 200 is also heated. Magnetic material 212 will reach cure temperature 239 for composite material 216. In these illustrative examples, magnetic material 212 is selected to provide a magnetic field after reaching a cure temperature, such as cure temperature 239.

In some illustrative examples, material 210 is removed from tool 200 after performing operation 206. In some illustrative examples, after removing material 210 from tool 200, second material 258 is positioned on tool 200. Machine head 202 is positioned in desired location 224 relative to second material 258 on tool 200 using sensor 218. Operation 206 is performed on second material 258 using machine head 202 starting at desired location 224.

Magnetic material 212 in tool 200 is used to locate machine head 202 relative to multiple pieces of material including material 210 and second material 258. Tool 200 is repeatedly used to position machine head 202 prior to performing manufacturing operations. Using tool 200 reduces manufacturing time for all structures using tool 200.

In some illustrative examples, magnetic material 212 also includes second portion of magnetic material 260. In some illustrative examples, machine head 202 is positioned in second desired location 262 relative to material 210 on tool 200 using sensor 218.

In some illustrative examples, operation 206 is performed on material 210 using machine head 202 starting at second desired location 262. In some other illustrative examples, second operation 208 is performed on material 210 using machine head 202 starting at second desired location 262.

In some illustrative examples, second operation 208 may be the same manufacturing operation as operation 206, but with different operation parameters. For example, second operation 208 may also be drilling, but at a different depth. As another example, second operation 208 may also be drilling, but a different diameter.

In some illustrative examples, second operation 208 may be a different manufacturing operation than operation 206. For example, second operation 208 may be drilling while operation 206 is painting. In another example, operation 206 is drilling 230, while second operation is one of painting, cleaning, priming, sanding, routing, or any other desirable manufacturing operation.

In some illustrative examples, first portion of magnetic material 228 associated with desired location 224 has first set of characteristics 234, wherein positioning machine head 202 in second desired location 262 comprises centering sensor 218 over second portion of magnetic material 260 having second set of characteristics 264 in tool 200, wherein first set of characteristics 234 is different than second set of characteristics 264.

In one illustrative example, material type 266 is different from material type 238. When material type 266 is different from material type 238, strength 236 of magnetic field 220 may be different from strength 268 of magnetic field 222. In another illustrative example, orientation 270 is different from orientation 240. When orientation 270 is different from orientation 240, the directions of magnetic field 220 and magnetic field 222 are different from each other.

In one illustrative example, strength 268 of magnetic field 222 is detected by sensor 218. Thickness 272 of material 210 in magnetic field 222 is determined using strength 268 of magnetic field 222. Thickness 272 is determined based on second set of characteristics 264 and knowledge of the depth of second portion of magnetic material 260 in tool 200.

Tool 200 may be manufactured using any desirable method. The manufacturing method may be selected based on first material 242. First material 242 may be any desirable type of material. In some illustrative examples, first material 242 is a metal. In these illustrative examples, first material 242 is a non-ferrous metal. In other illustrative examples, first material 242 is a ceramic. In other illustrative examples, first material 242 is a composite material.

In some illustrative examples, first material 242 is laid down to form tool base 274. Magnetic material 212 is positioned at number of locations 214 on tool base 274. In some illustrative examples, magnetic material 212 is encompassed to form tool 200. In one illustrative example, after positioning magnetic material 212 at number of locations 214, first material 242 is placed over magnetic material 212. In another illustrative example, after positioning magnetic material 212 at number of locations 214, another material (not depicted) is placed over magnetic material 212 to encompass magnetic material 212.

In other illustrative examples, magnetic material 212 is present on layup surface 244. In these illustrative examples, magnetic material 212 is held in place by first material 242 or any other desirable material. In some illustrative examples, when magnetic material 212 is present on layup surface 244, an adhesive holds magnetic material 212 at number of locations 214. In some illustrative examples, when magnetic material 212 is present on layup surface 244, a coating (not depicted) is present to form the remainder of layup surface 244.

Magnetic material 212 may be selected from any desirable type of material that emits magnetic fields. In some illustrative examples, positioning magnetic material 212 comprises positioning at least one of a ferrous magnetic material or a rare earth magnetic material.

In some illustrative examples, first material 242 is a composite material, and tool 200 is cured after laying down first material 242 over magnetic material 212. In some illustrative examples, machining a surface of tool 200 forms layup surface 244. In some illustrative examples, positioning magnetic material 212 at number of locations 214 on tool base 274 comprises positioning first portion of magnetic material 228 having first set of characteristics 234 at first location 278 on tool base 274. In some illustrative examples, positioning second portion of magnetic material 260 having second set of characteristics 264 at second location 280 on tool base 274, wherein first set of characteristics 234 are different from the second set of characteristics 264.

Tool 200 is configured to locate number of operations 213 on material 210. Tool 200 comprises layup surface 244 configured to mate with material 210 and magnetic material 212 positioned at number of locations 214 in tool 200 corresponding to number of locations 211 for performance of number of operations 213 on material 210. In some illustrative examples, magnetic material 212 comprises magnetic material 212 having more than one orientation relative to layup surface 244. For example, orientation 240 and orientation 270 may be different.

In some illustrative examples, magnetic material 212 comprises magnetic material 212 having more than one strength measured at layup surface 244. For example, strength 236 and strength 268 may be different.

In some illustrative examples, magnetic material 212 is embedded within a composite material of tool 200. For example, magnetic material 212 may be embedded within first material 242. In some illustrative examples, first material 242 is a composite material.

In some illustrative examples, system 284 is configured to perform number of operations 213. System 284 comprises machine head 202 and sensor 218. Machine head 202 is configured to perform operation 206 on material 210 on tool 200 using operational component 233. Sensor 218 is connected to machine head 202 and calibrated to detect magnetic material 212 in tool 200 beneath material 210.

As depicted, system 284 further comprises controller 286 configured to position machine head 202 in desired location 224 relative to material 210 on tool 200 using sensor 218 connected to machine head 202. In some illustrative examples, controller 286 takes the form of numerical control machine 255.

In some illustrative examples, controller 286 is configured to instruct machine head 202 to perform operation 206 on material 210 starting at desired location 224. In some illustrative examples, controller 286 is further configured to move machine head 202 relative to tool 200 along preset path 226. In some illustrative examples, controller 286 is further configured to stop machine head 202 from moving along preset path 226 in response to sensor 218 detecting first portion of magnetic material 228 in tool 200. In these illustrative examples, stopping machine head 202 positions machine head 202 in the desired location 224.

In some illustrative examples, system 284 further comprises tool 200 configured to locate operation 206 on material 210. Tool 200 comprises layup surface 244 configured to mate with material 210 and magnetic material 212 positioned at number of locations 214 in tool 200 corresponding to number of locations 211 for performance of number of operations 213 on material 210.

The illustration of manufacturing environment 204 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In some illustrative examples, material 210 on tool 200 is part 288. In these illustrative examples, prior to performing operation 206, tool 200 is connected to part 288. In these illustrative examples, after performing operation 206, tool 200 is disconnected from part 288.

In some illustrative examples, after disconnecting tool 200 from part 288, tool 200 is connected to second part 290. In these illustrative examples, second material 258 is second part 290.

In some illustrative examples, machine head 202 is positioned in desired location 224 relative to second part 290 using sensor 218. In some illustrative examples, operation 206 is performed on second part 290 using machine head 202 starting at desired location 224.

Figure 3:
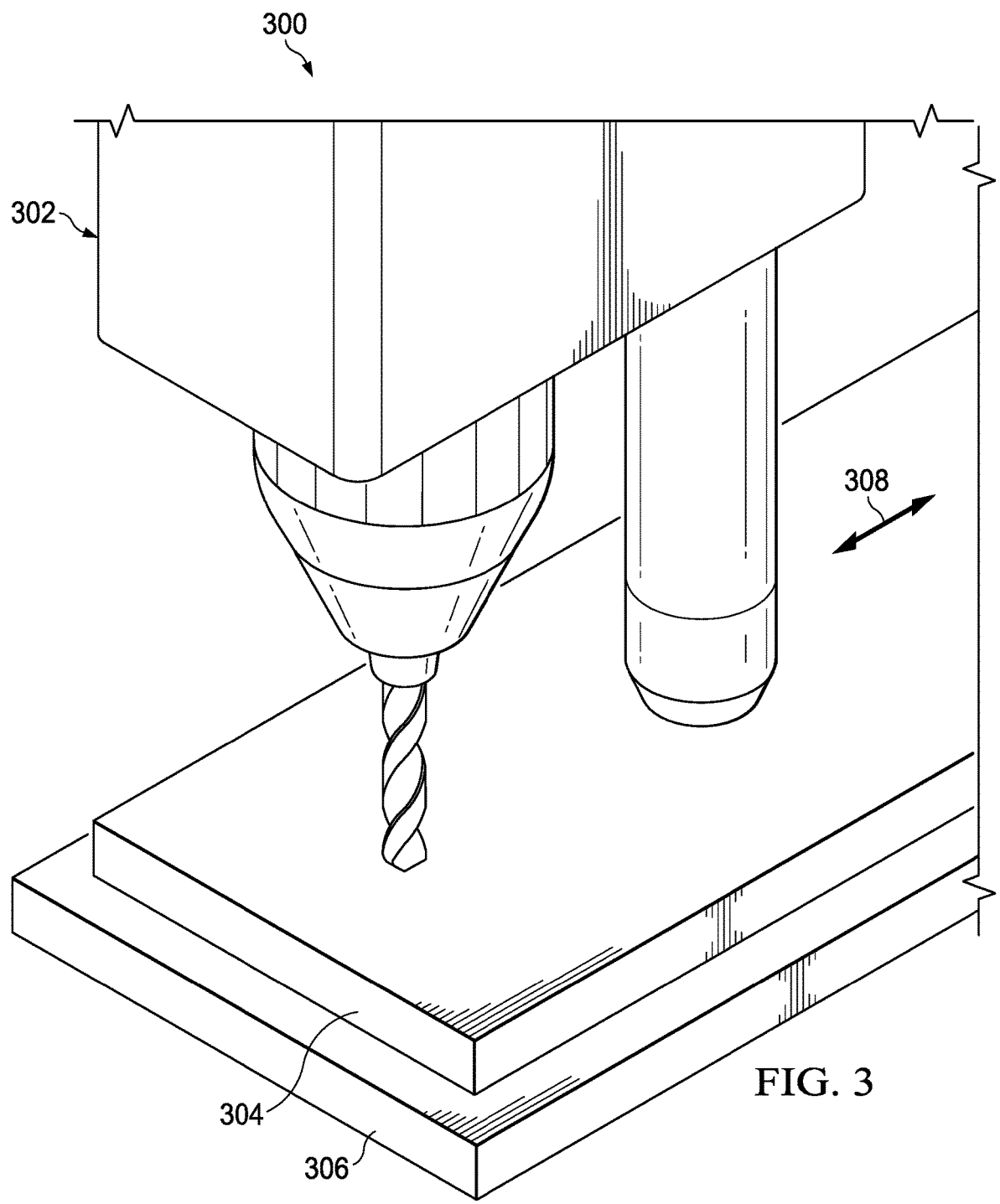
FIG. 3 is an illustration of an isometric view of a machine head moving in a preset path across a material on a tool in accordance with an illustrative embodiment.

Turning now to FIG. 3, an illustration of an isometric view of a machine head moving in a preset path across a material on a tool is depicted in accordance with an illustrative embodiment. Manufacturing environment 300 is a physical implementation of manufacturing environment 204 of FIG. 2. Machine head 302 is a physical implementation of machine head 202 of FIG. 2. Machine head 302 is positioned relative to material 304 on tool 306 to perform an operation on material 304. Material 304 is a physical implementation of material 210 of FIG. 2. Tool 306 is a physical implementation of tool 200 of FIG. 2.

In one illustrative example, machine head 302 moves relative to material 304 along present path 308. In other illustrative examples, tool 306 is moved relative to machine head 302 along present path 308. Due to the combined size and combined weight of material 304 and tool 306, it may be desirable to move machine head 302 relative to material 304.

Material 304 and tool 306 are non-limiting examples provided only for illustrative purposes. Material 304 and tool 306 are not intended to imply architectural limitations as to the manner in which different illustrative embodiments may be implemented. For example, tool 306 may have any desirable size, shape, or curvature. Further, depending on the size, shape, and intended use of tool 306, tool 306 may have any desirable support structure (not depicted). Material 304 may have any desirable size, shape, thickness, and position relative to tool 306.

Figure 4:
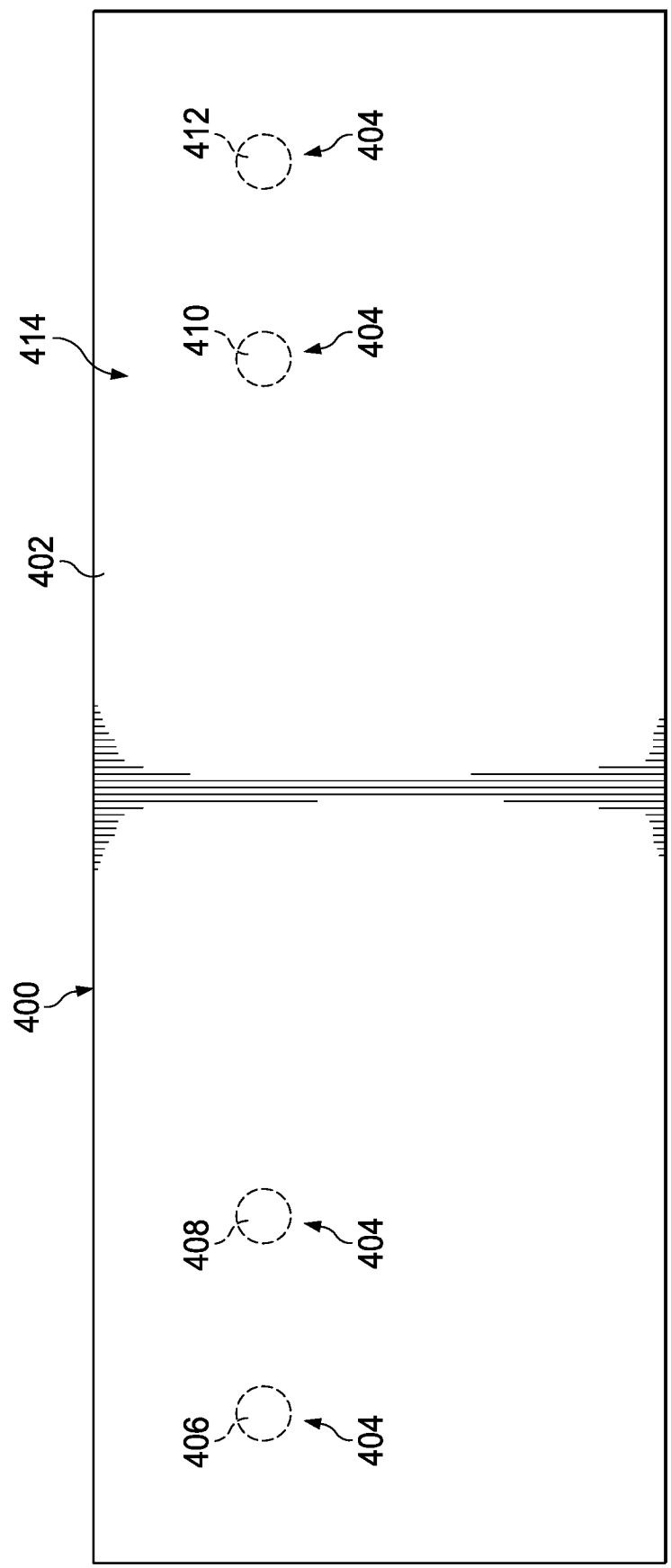
FIG. 4 is an illustration of a top view of a tool with magnetic material in accordance with an illustrative embodiment.

Turning now to FIG. 4, an illustration of a top view of a tool with magnetic material is depicted in accordance with an illustrative embodiment. Tool 400 is a physical implementation of tool 200 of FIG. 2. Magnetic material 402 in number of locations 404 is a physical implementation of magnetic material 212 of FIG. 2.

As depicted, magnetic material 402 includes first portion of magnetic material 406, second portion of magnetic material 408, third portion of magnetic material 410, and fourth portion of magnetic material 412. As depicted, each of first portion of magnetic material 406, second portion of magnetic material 408, third portion of magnetic material 410, and fourth portion of magnetic material 412 is embedded in tool 400.

Tool 400 has a surface configured to mate to a material, such as material 210 of FIG. 2. The surface of tool 400 has any desirable curvature. As depicted, the surface is planar.

Tool 400 is only one non-limiting example of an illustration of tool 200 of FIG. 2. Tool 400 is not intended to imply architectural limitations as to the manner in which different illustrative embodiments may be implemented. Other non-illustrated examples may have any desirable quantity of portions of magnetic material. Further, other non-illustrated examples may have magnetic material positioned in any desirable locations. As depicted, tool 400 is rectangular, but tool 400 may have any desirable size, shape, or curvature. The surface of tool 400 has any desirable curvature depending upon the material or part to receive processing. The surface is configured to mate against the material or part to receive processing. For example, when tool 400 is configured to be used to locate and perform operations on a cover for engine 108, the surface of tool 400 is curved to mate with the cover for engine 108. For example, when tool 400 is configured to be used to locate and perform operations on horizontal stabilizer 114, the surface of tool 400 is curved to mate with first horizontal stabilizer 114.

Figure 5:
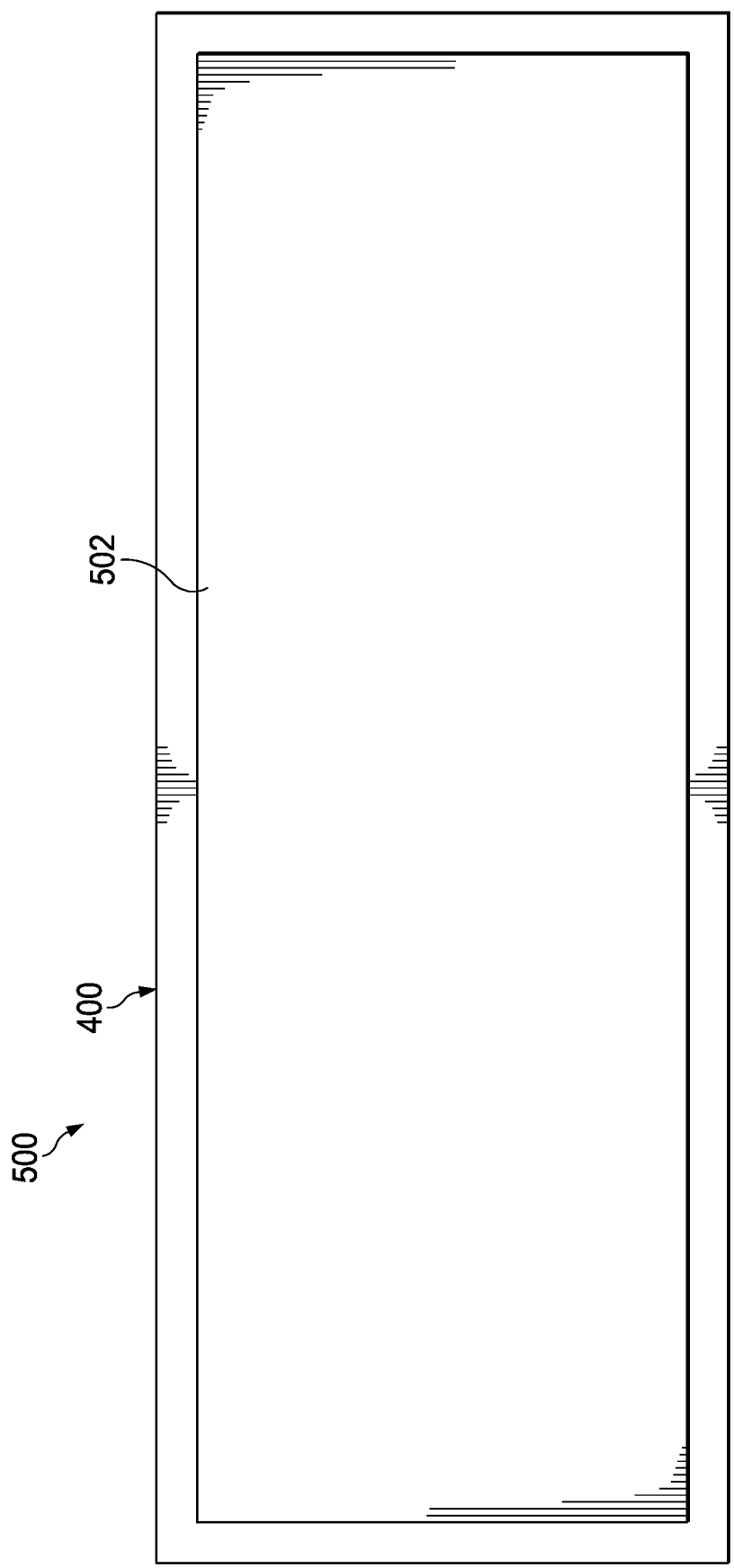
FIG. 5 is an illustration of a top view of a material on a tool with magnetic material in accordance with an illustrative embodiment.

Turning now to FIG. 5, an illustration of a top view of a material on a tool with magnetic material is depicted in accordance with an illustrative embodiment. View 500 is a view of material 502 on tool 400. Material 502 is a physical implementation of material 210 of FIG. 2. Material 502 takes the form of any desirable type of material. In some illustrative examples, material 502 is a composite material. In other illustrative examples, material 502 is a metallic material. In other illustrative examples, material 502 is a polymeric material.

Figure 6:
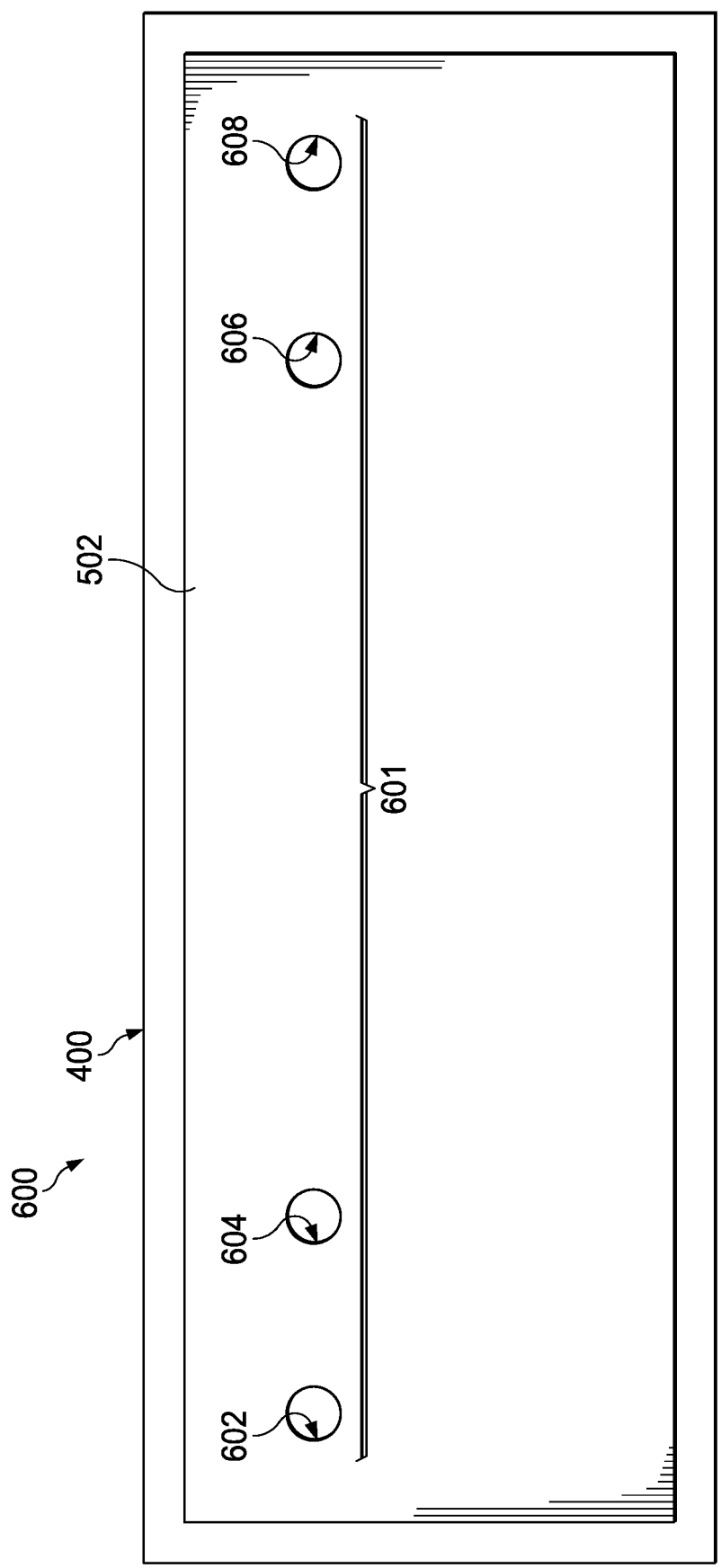
FIG. 6 is an illustration of a top view of a material with drilled holes on a tool with magnetic material in accordance with an illustrative embodiment.

Turning now to FIG. 6, an illustration of a top view of a material with drilled holes on a tool with magnetic material is depicted in accordance with an illustrative embodiment. View 600 is a view of material 502 on tool 400 after performing a number of operations on material 502.

As depicted, number of holes 601 have been drilled into material 502. Each of number of holes 601 is associated with a location of number of locations 404 of FIG. 4. Each of number of holes 601 is associated with respective magnetic material of magnetic material 402 of FIG. 4. For example, first hole 602 is associated with first portion of magnetic material 406 of FIG. 4. Second hole 604 is associated with second portion of magnetic material 408 of FIG. 4. Third hole 606 is associated with third portion of magnetic material 410 of FIG. 4. Fourth hole 608 is associated with fourth portion of magnetic material 412 of FIG. 4.

A machine head (not depicted) is positioned relative to material 502 using first portion of magnetic material 406 of FIG. 4. After positioning the machine head (not depicted) using first portion of magnetic material 406 of FIG. 4, first hole 602 is drilled. After positioning the machine head (not depicted) using second portion of magnetic material 408 of FIG. 4, second hole 604 is drilled. After positioning the machine head (not depicted) using third portion of magnetic material 410 of FIG. 4, third hole 606 is drilled. After positioning the machine head (not depicted) using fourth portion of magnetic material 412 of FIG. 4, fourth hole 608 is drilled.

Figure 7:
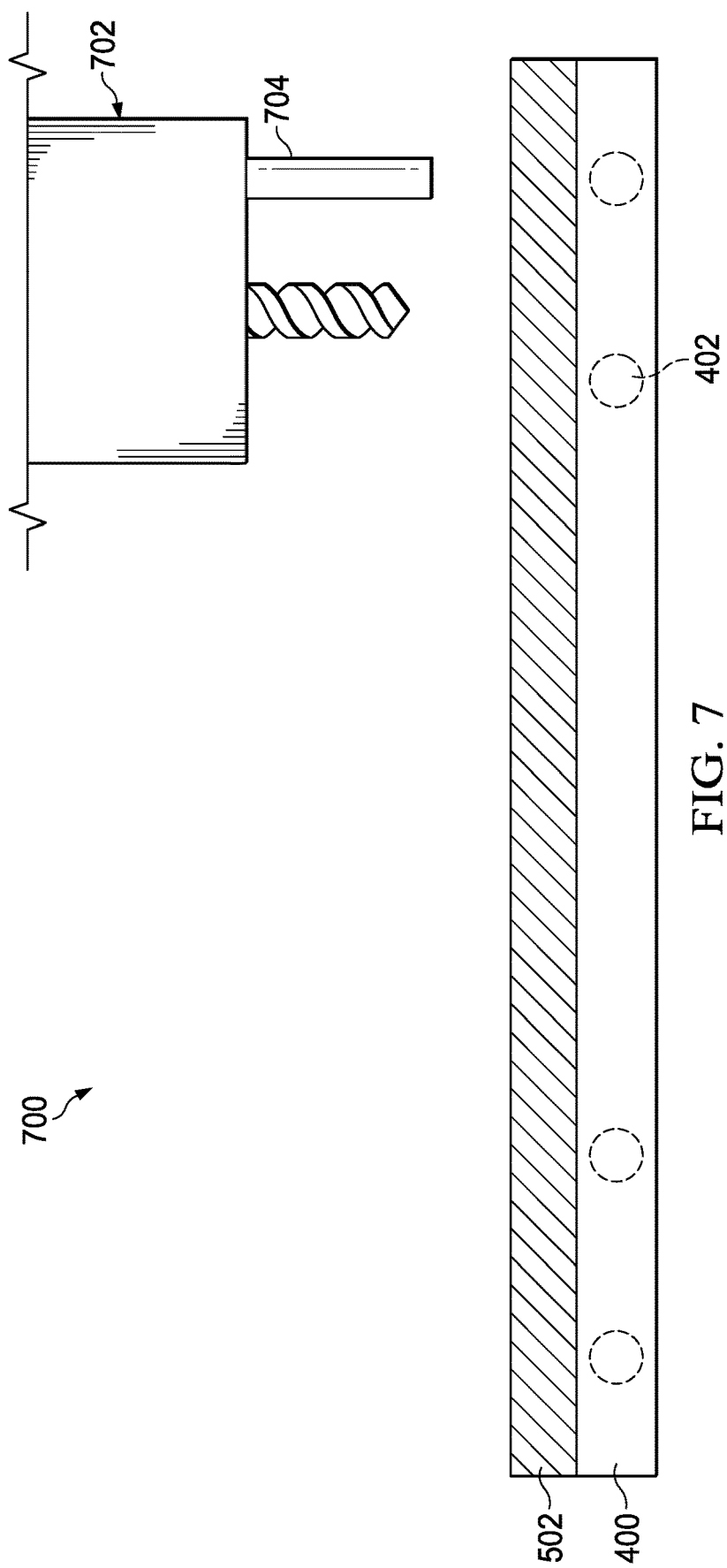
FIG. 7 is an illustration of a side view of a material on a tool with magnetic material in accordance with an illustrative embodiment.

Turning now to FIG. 7, an illustration of a side view of a material on a tool with magnetic material is depicted in accordance with an illustrative embodiment. View 700 is a side view of tool 400 with material 502 and machine head 702. Machine head 702 is a physical implementation of machine head 202 of FIG. 2.

Sensor 704 is connected to machine head 702. Sensor 704 is calibrated to detect magnetic material 402. In view 700, sensor 704 is positioned above material 502. In some illustrative examples, sensor 704 detects magnetic material 402 when sensor 704 is elevated above material 502.

In some illustrative examples, machine head 702 is depicted as machine head 702 moves along a preset path (not depicted). In some illustrative examples, machine head 702 is depicted prior to moving along a preset path (not depicted).

Figure 8:
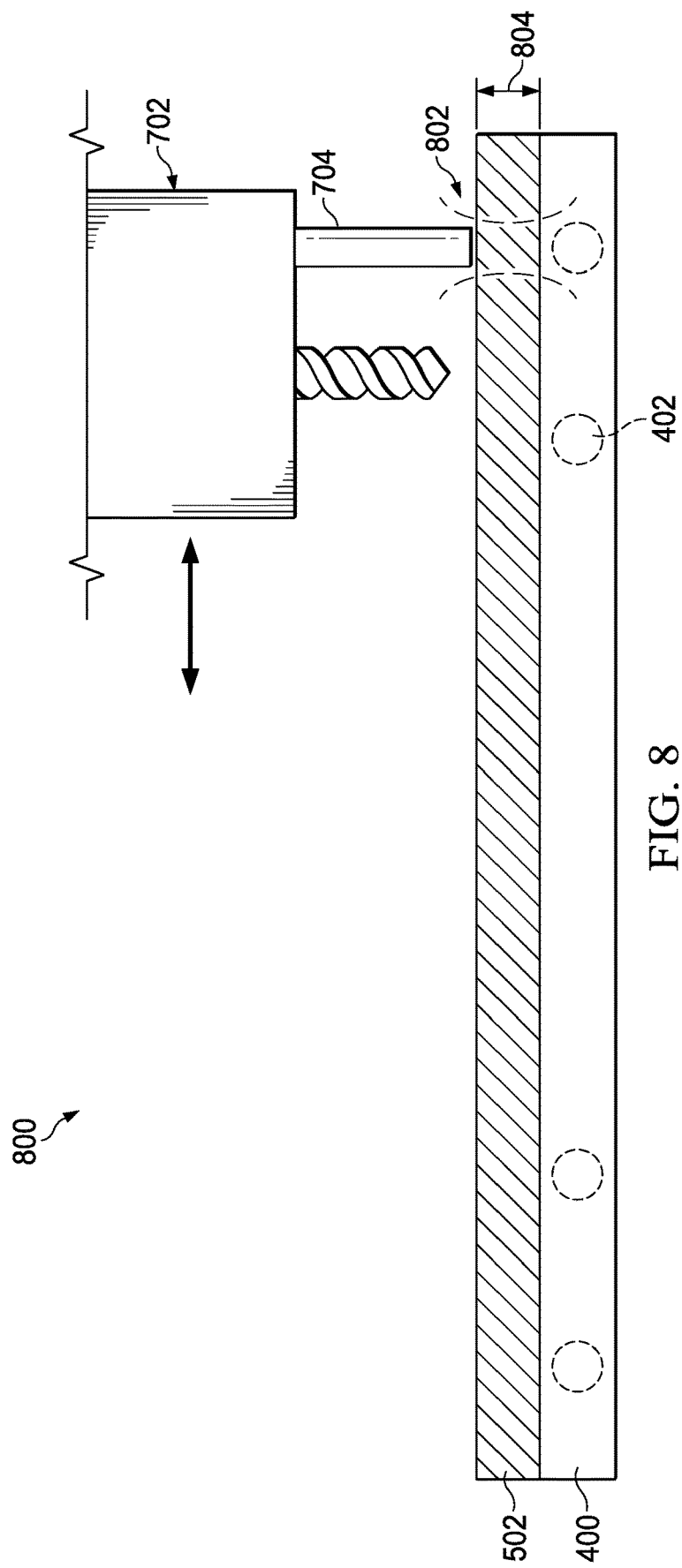
FIG. 8 is an illustration of a side view of a machine head moving in a preset path across a material on a tool with magnetic material in accordance with an illustrative embodiment.

Turning now to FIG. 8, an illustration of a side view of a machine head moving in a preset path across a material on a tool with magnetic material is depicted in accordance with an illustrative embodiment. In view 800, sensor 704 contacts material 502. In some illustrative examples, machine head 702 moves along a preset path (not depicted) as sensor 704 contacts material 502. When sensor 704 detects magnetic material 402 as sensor 704 contacts material 502, a thickness (not depicted) of material 502 may be determined based on the strength of the detected magnetic field.

Sensor 704 may determine the strength of a detected magnetic field. For example, sensor 704 may determine the strength of magnetic field 802 from fourth portion of magnetic material 412 of FIG. 4. The strength of magnetic field 802 may be used to determine thickness 804 of material 502.

Figure 9:
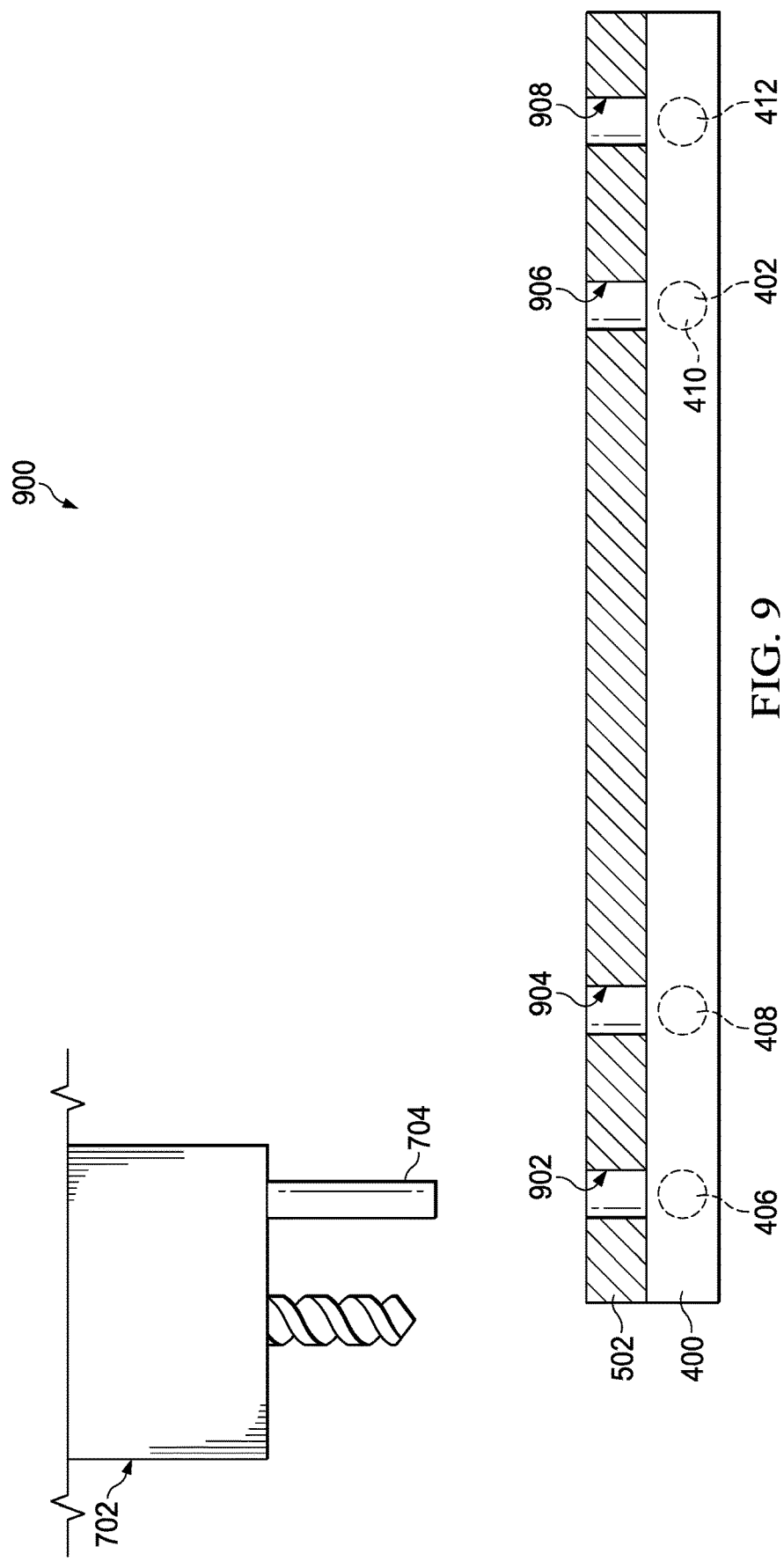
FIG. 9 is an illustration of a side view of a material on a tool with magnetic material after performing a number of manufacturing operations on the material in accordance with an illustrative embodiment.

Turning now to FIG. 9, an illustration of a side view of a material on a tool with magnetic material after performing a number of manufacturing operations on the material is depicted in accordance with an illustrative embodiment. View 900 is a view of material 502 after an operation has been performed at a number of locations. For an example, an operation has been performed on material 502 after positioning machine head 702 using each of first portion of magnetic material 406, second portion of magnetic material 408, third portion of magnetic material 410, and fourth portion of magnetic material 412.

In this illustrative example, hole 902 is positioned over first portion of magnetic material 406. In this illustrative example, hole 904 is positioned over second portion of magnetic material 408. In this illustrative example, hole 906 is positioned over third portion of magnetic material 410. In this illustrative example, hole 908 is positioned over fourth portion of magnetic material 412.

Figure 10:
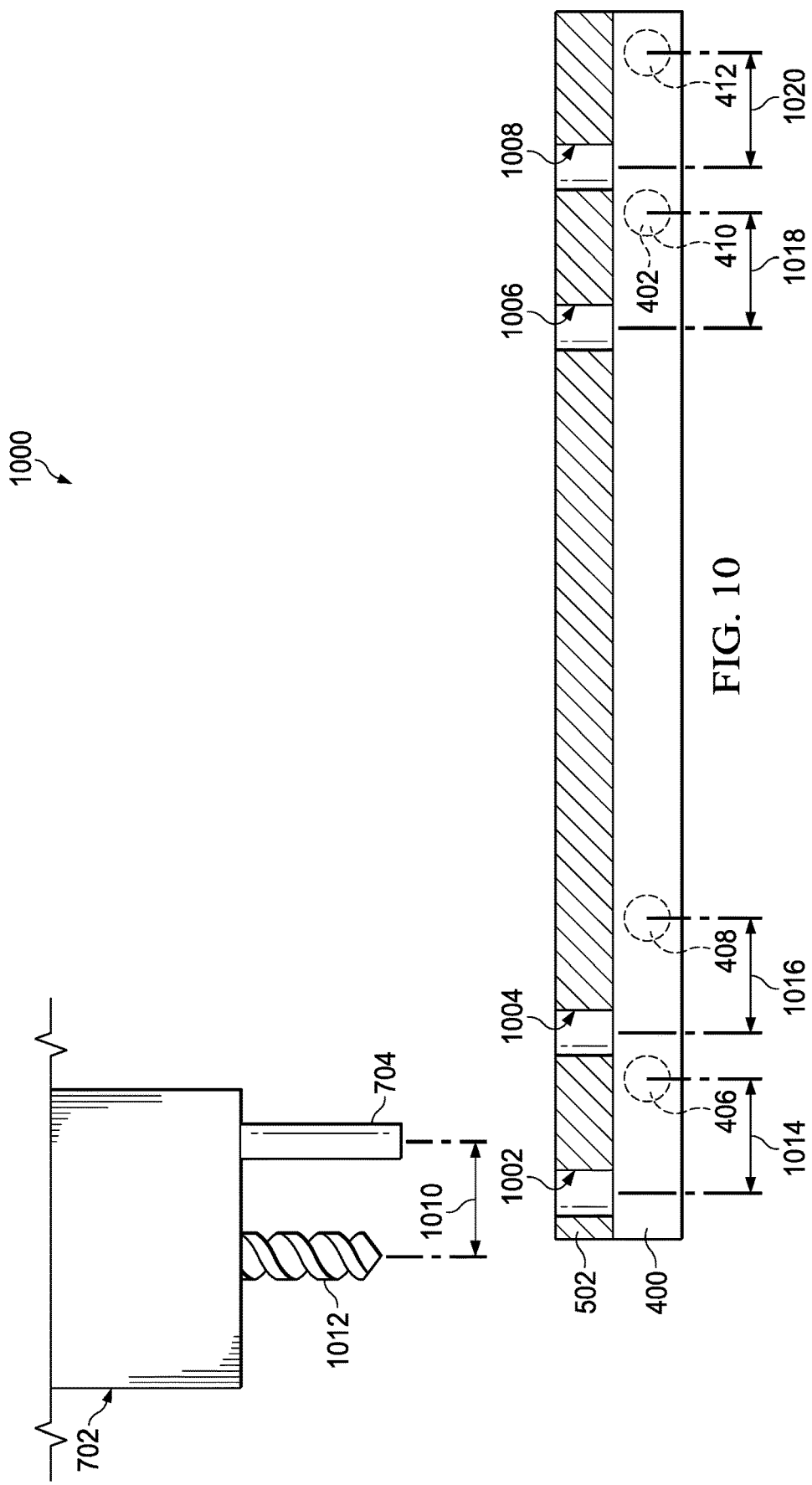
FIG. 10 is an illustration of a side view of a material on a tool with magnetic material after performing a number of manufacturing operations on the material in accordance with an illustrative embodiment.

Turning now to FIG. 10, an illustration of a side view of a material on a tool with magnetic material after performing a number of manufacturing operations on the material is depicted in accordance with an illustrative embodiment. View 1000 is a view of material 502 after an operation has been performed at a number of locations. For an example, an operation has been performed on material 502 after positioning machine head 702 using each of first portion of magnetic material 406, second portion of magnetic material 408, third portion of magnetic material 410, and fourth portion of magnetic material 412.

In this illustrative example, hole 1002 is positioned offset from first portion of magnetic material 406. In this illustrative example, hole 1004 is positioned offset from second portion of magnetic material 408. In this illustrative example, hole 1006 is positioned offset from third portion of magnetic material 410. In this illustrative example, hole 1008 is positioned offset from fourth portion of magnetic material 412.

In this illustrative example, each offset is based on offset 1010 between drill 1012 and sensor 704 of machine head 702. For example, offset 1014 between hole 1002 and first portion of magnetic material 406 is the same as offset 1010. Offset 1016 between hole 1004 and second portion of magnetic material 408 is the same as offset 1010. Offset 1018 between hole 1006 and third portion of magnetic material 410 is the same as offset 1010. Offset 1020 between hole 1008 and fourth portion of magnetic material 412 is the same as offset 1010.

Figure 11:
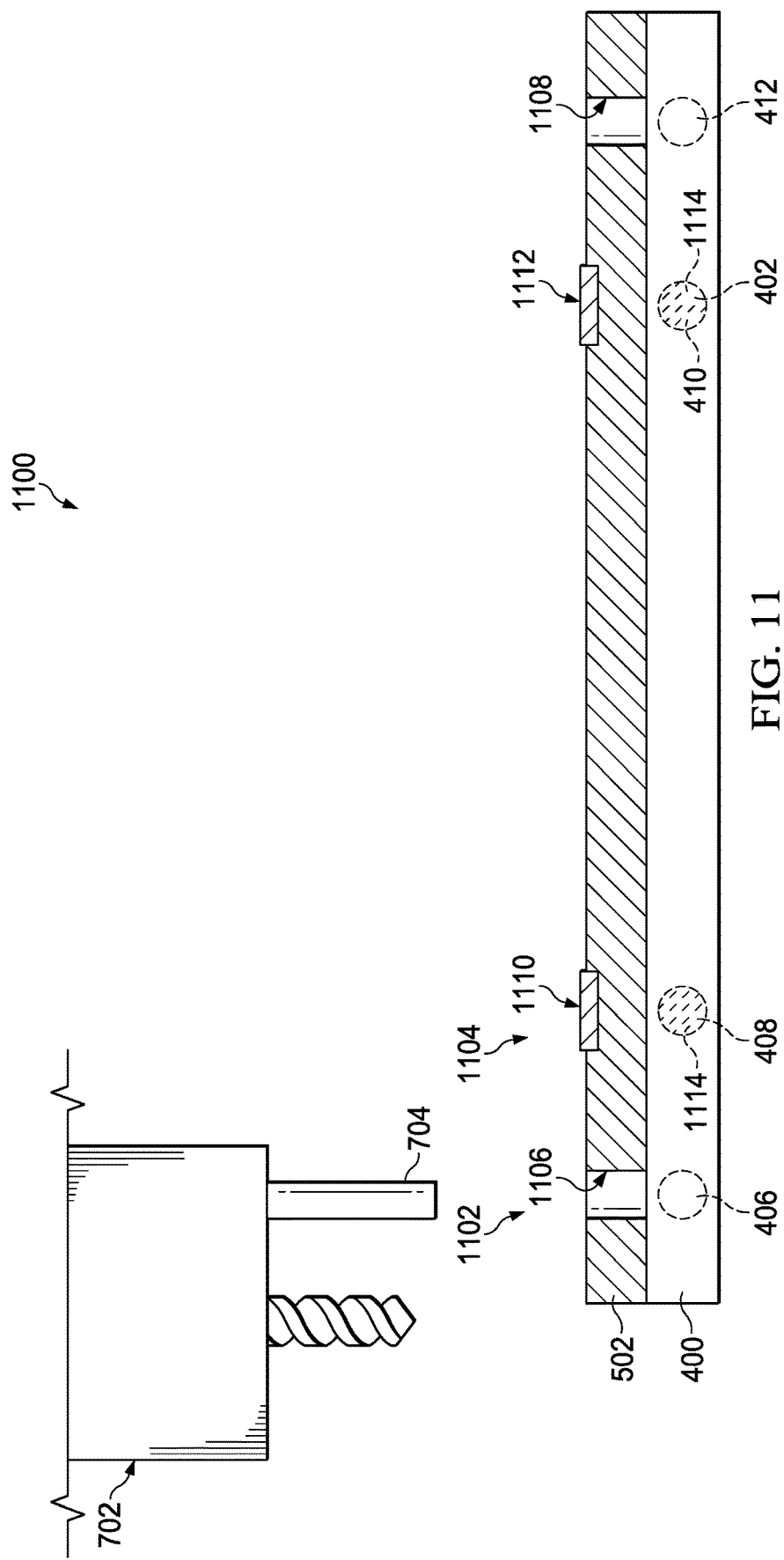
FIG. 11 is an illustration of a side view of a material on a tool with magnetic material after performing a number of manufacturing operations on the material in accordance with an illustrative embodiment.

Turning now to FIG. 11, an illustration of a side view of a material on a tool with magnetic material after performing a number of manufacturing operations on the material is depicted in accordance with an illustrative embodiment. In view 1100, a number of operations has been performed on material 502. As depicted, first operation 1102 is drilling. As depicted, second operation 1104 is a surface treatment. Second operation 1104 may include any desirable chemical or mechanical surface treatment including adding a coating, painting, changing a surface texture, or any other desirable surface treatment. Hole 1106 is associated with first portion of magnetic material 406. Hole 1108 is associated with fourth portion of magnetic material 412.

First portion of magnetic material 406 and fourth portion of magnetic material 412 have a first set of characteristics. The first set of characteristics indicates to perform first operation 1102. In some illustrative examples, the strength of the first set of characteristics indicates first operation 1102. The strength of first portion of magnetic material 406 may be adjusted by changing any of the type of material, the depth of material, or the amount of material in first portion of magnetic material 406. The strength of fourth portion of magnetic material 412 may be adjusted by changing any of the type of material, the depth of material, or the amount of material in fourth portion of magnetic material 412.

In other illustrative examples, an orientation of the first set of characteristics indicates first operation 1102. The orientation of first portion of magnetic material 406 may be adjusted by changing the direction first portion of magnetic material 406 is facing. The orientation of fourth portion of magnetic material 412 may be adjusted by changing the direction fourth portion of magnetic material 412 is facing.

Surface treatment 1110 is associated with second portion of magnetic material 408. Surface treatment 1112 is associated with third portion of magnetic material 410. Second portion of magnetic material 408 and third portion of magnetic material 410 have a second set of characteristics. The second set of characteristics indicates to perform second operation 1104. In this illustrative example, second portion of magnetic material 408 and third portion of magnetic material 410 are depicted with cross-hatching 1114.

In some illustrative examples, the strength of the second set of characteristics indicates second operation 1104. The strength of second portion of magnetic material 408 may be adjusted by changing any of the type of material, the depth of material, or the amount of material in second portion of magnetic material 408. The strength of third portion of magnetic material 410 may be adjusted by changing any of the type of material, the depth of material, or the amount of material in third portion of magnetic material 410.

In other illustrative examples, an orientation of the second set of characteristics indicates second operation 1104. The orientation of second portion of magnetic material 408 may be adjusted by changing the direction second portion of magnetic material 408 is facing. The orientation of third portion of magnetic material 410 may be adjusted by changing the direction third portion of magnetic material 410 is facing.

Figure 12:
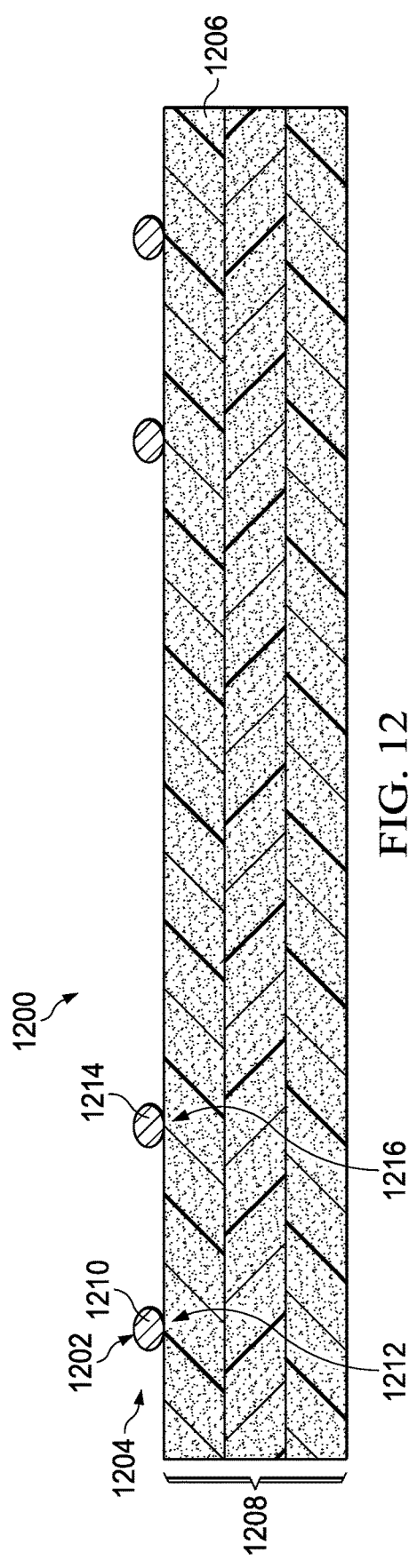
FIG. 12 is an illustration of magnetic material placed on a number of locations of a tool base in accordance with an illustrative embodiment.

Turning now to FIG. 12, an illustration of magnetic material placed on a number of locations of a tool base is depicted in accordance with an illustrative embodiment. In view 1200, magnetic material 1202 is positioned at number of locations 1204 on tool base 1206. Tool base 1206 is a physical implementation of tool base 274 of FIG. 2. Magnetic material 1202 is a physical implementation of magnetic material 212 of FIG. 2.

As depicted, tool base 1206 includes layers of composite material 1208. A first material is laid down to form tool base 1206. In this illustrative example, the first material is a composite material.

Magnetic material 1202 is positioned using any desirable method. In some illustrative examples, for locational accuracy, magnetic material 1202 is positioned using laser sighting. By positioning using laser sighting, magnetic material 1202 is positioned with sufficient accuracy to use magnetic material 1202 as a reference for positioning a machine head (not depicted).

Magnetic material 1202 takes the form of any desirable kind of magnetic material. In some illustrative examples, positioning magnetic material 1202 comprises positioning at least one of a ferrous magnetic material or a rare earth magnetic material. In some illustrative examples, magnetic material 1202 includes more than one type of magnetic material. In other illustrative examples, magnetic material 1202 has more than one orientation.

In some illustrative examples, magnetic material 1202 is somewhat undersized relative to the desired size for the manufacturing operation. For example, magnetic material 1202 may be sized less than a hole size to drill in a material (not depicted).

In some illustrative examples, positioning magnetic material 1202 at number of locations 1204 on tool base 1206 comprises positioning first portion of magnetic material 1210 having a first set of characteristics at first location 1212 on tool base 1206. In these illustrative examples, second portion of magnetic material 1214 having a second set of characteristics is positioned at second location 1216 on tool base 1206. In some illustrative examples, the first set of characteristics are different from the second set of characteristics. In other illustrative examples, the first set of characteristics is the same as the second set of characteristics.

Figure 13:
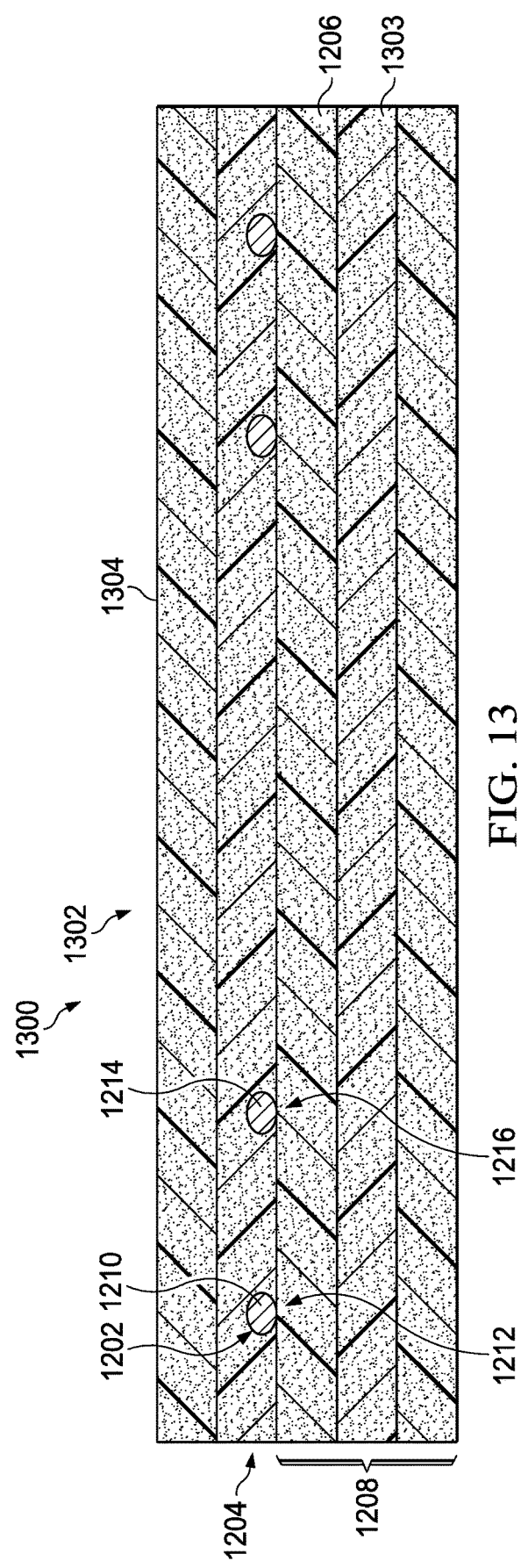
FIG. 13 is an illustration of a tool with magnetic material in accordance with an illustrative embodiment.

Turning now to FIG. 13, an illustration of a tool with magnetic material is depicted in accordance with an illustrative embodiment. Tool 1300 includes magnetic material 1202. Magnetic material 1202 has been encompassed to form tool 1302. In some illustrative examples, encompassing magnetic material 1202 comprises laying down the first material 1303 over magnetic material 1202 to encompass the magnetic material 1202 within tool 1300 formed from first material 1303. When first material 1303 is a composite material, tool 1300 is cured after laying down first material 1303 over magnetic material 1202.

Tool 1302 has surface 1304. In some illustrative examples, surface 1304 is formed with a desired shape to mate to a material or a part to receive manufacturing operations. In other illustrative examples, surface 1304 receives additional processing to form a desired shape to mate to a material or a part to receive manufacturing operations.

Turning now to FIG. 14, an illustration of a tool with magnetic material is depicted in accordance with an illustrative embodiment. In view 1400, surface 1304 of tool 1302 has been machined to form layup surface 1402. In some illustrative examples, layup surface 1402 is configured to shape a material to be laid up and processed on layup surface 1402. In some illustrative examples, layup surface 1402 is configured to mate to a part to receive manufacturing processes.

As depicted, layup surface 1402 has a curvature that may have any desirable shape depending on the shape of the part to receive manufacturing processes.

Turning now to FIG. 15, an illustration of a tool with magnetic material is depicted in accordance with an illustrative embodiment. In tool 1500, magnetic material 1502 is not encompassed within tool 1500. Tool 1500 is a physical implementation of tool 200 of FIG. 2. In tool 1500, magnetic material 1502 is part of surface 1504 of tool 1500.

Tool 1500 includes tool base 1506 and magnetic material 1502 in number of locations 1508 on tool base 1506. Coating 1510 is present on surface 1504 to level surface 1504. When coating 1510 is present, magnetic material 1502 does not create "bumps" in surface 1504.

Figure 16:
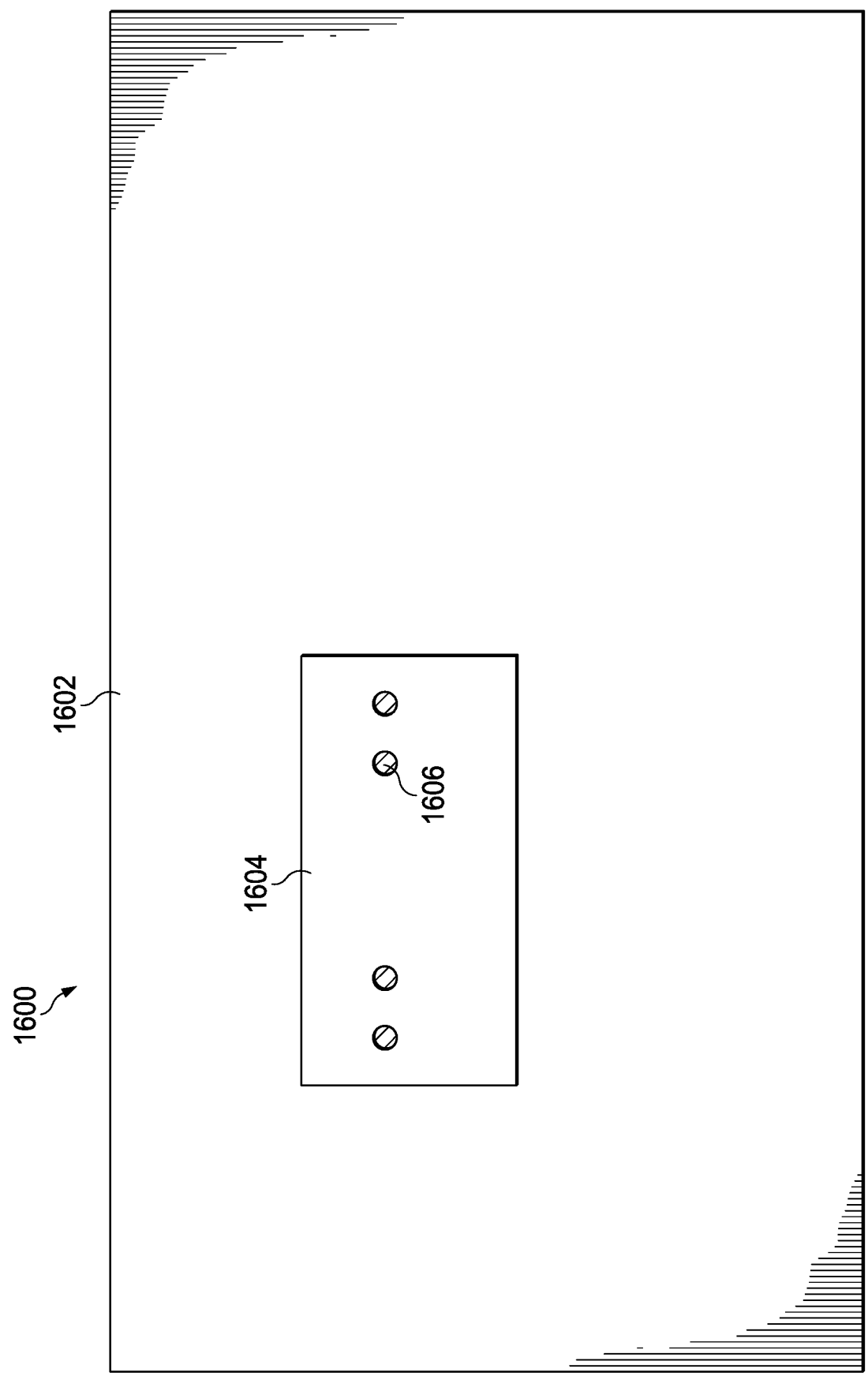
FIG. 16 is an illustration of a tool held against a material in accordance with an illustrative embodiment.

Turning now to FIG. 16, an illustration of a tool held against a material is depicted in accordance with an illustrative embodiment. Manufacturing environment 1600 is a physical implementation of manufacturing environment 204 of FIG. 2. Material 1602 is a physical implementation of material 210 of FIG. 2. Tool 1604 is a physical implementation of tool 200 of FIG. 2.

As depicted, material 1602 is larger than tool 1604. In manufacturing environment 1600, tool 1604 is moved relative to material 1602 to position tool 1604. After tool 1604 is referenced to material 1602, tool 1604 is secured to material 1602.

As depicted, tool 1604 may be used as a drilling jig. Magnetic material 1606 within tool 1604 is detected by a machine head (not depicted) to position the machine head (not depicted) relative to material 1602.

The different components shown in FIGS. 1 and 3-16 may be combined with components in FIG. 2, used with components in FIG. 2, or a combination of the two. Additionally, some of the components in FIGS. 1 and 3-16 may be illustrative examples of how components shown in block form in FIG. 2 can be implemented as physical structures.

Figure 17:
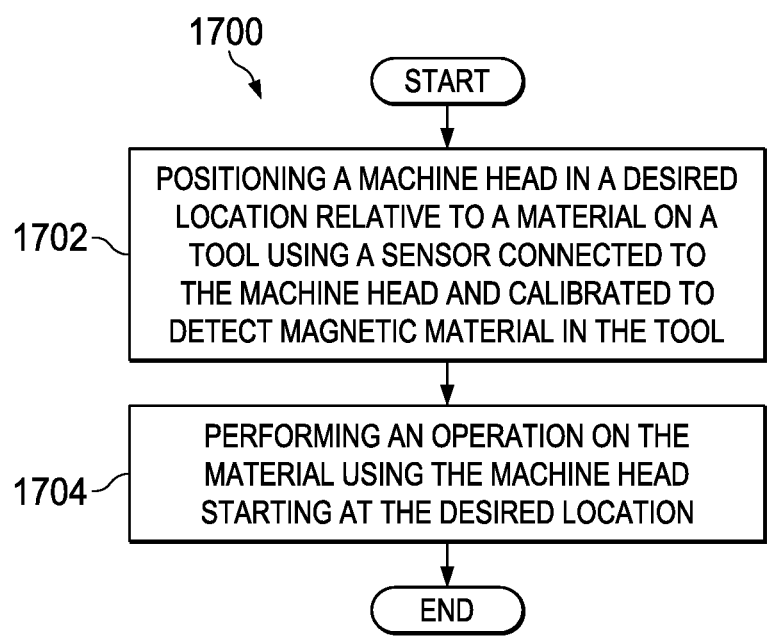
FIG. 17 is an illustration of a flowchart of a method for performing an operation on a material on a tool in accordance with an illustrative embodiment.

Turning now to FIG. 17, an illustration of a flowchart of a method for performing an operation on a material on a tool is depicted in accordance with an illustrative embodiment. Method 1700 may be performed using tool 200 of FIG. 2. In some illustrative examples, method 1700 may be performed using one of tool 400 of FIGS. 4-11, tool 1302 of FIGS. 13-14, tool 1500 of FIG. 15, or tool 1604 of FIG. 16. Method 1700 may be performed using machine head 202 to perform an operation on material 210 of FIG. 2.

Method 1700 positions a machine head in a desired location relative to a material on a tool using a sensor connected to the machine head and calibrated to detect magnetic material in the tool (operation 1702). Method 1700 performs an operation on the material using the machine head starting at the desired location (operation 1704).

Figure 18B:
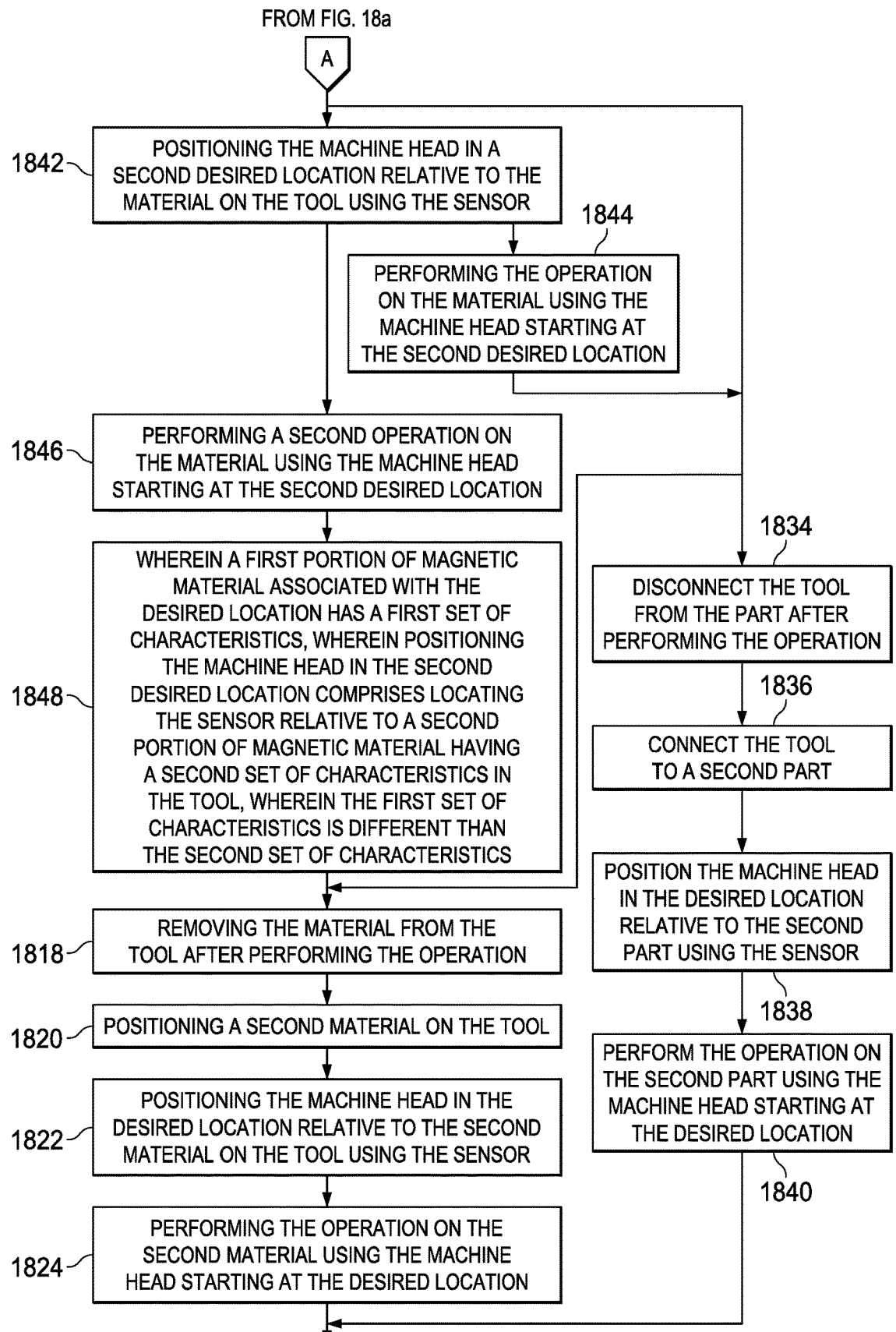

Turning now to FIGS. 18A and 18B, illustrations of a flowchart of a method for locating a machine head relative to a tool and performing a number of manufacturing operations are depicted in accordance with an illustrative embodiment. Method 1800 may be performed using tool 200 of FIG. 2. In some illustrative examples, method 1800 may be performed using one of tool 400 of FIGS. 4-11, tool 1302 of FIGS. 13-14, tool 1500 of FIG. 15, or tool 1604 of FIG. 16. Method 1800 may be performed using machine head 202 to perform an operation on material 210 of FIG. 2.

In some illustrative examples, method 1800 moves the machine head relative to the tool along a preset path (operation 1802). In other illustrative examples, method 1800 moves the tool relative to the machine head along a preset path (operation 1804).

Method 1800 positions a machine head in a desired location relative to a material on a tool using a sensor connected to the machine head and calibrated to detect magnetic material in the tool (operation 1806). When method 1800 moves the machine head relative to the tool along a preset path, positioning the machine head in the desired location comprises stopping the machine head from moving along the preset path in response to the sensor detecting a first portion of magnetic material in the tool. When method 1800 moves the tool relative to the machine head along a preset path, positioning the machine head in the desired location comprises stopping the tool from moving along the preset path in response to the sensor detecting a first portion of magnetic material in the tool. In some illustrative examples, positioning the machine head in method 1800 comprises locating the sensor relative to a first portion of magnetic material in the tool (operation 1808).

Method 1800 performing an operation on the material using the machine head starting at the desired location (operation 1810). In some illustrative examples, method 1800 stops the operation on the material based on readings from the sensor (operation 1812).

In some illustrative examples, when the operation is drilling, method 1800 automatically stops drilling when the material has been drilled to a desired depth (operation 1814). In some illustrative examples, when the operation is drilling, method 1800 stops the operation, wherein stopping the operation comprises stopping drilling when the machine head has moved one of a desired distance or a maximum distance based on a thickness of the material determined from a strength of the magnetic field detected by the sensor (operation 1816).

Method 1800 removes the material from the tool after performing the operation (operation 1818). Method 1800 positions a second material on the tool (operation 1820). Method 1800 positions the machine head in the desired location relative to the second material on the tool using the sensor (operation 1822). Method 1800 performs the operation on the second material using the machine head starting at the desired location (operation 1824).

In some illustrative examples, the material is a composite material. Optional operations 1826 through 1830 describe potential operations when the material is a composite material. When the material is a composite material, in some illustrative examples, method 1800 lays down the composite material on the tool (operation 1826). In some illustrative examples, positioning the machine head may be performed prior to curing the composite material. For example, an operation to be performed by the machine head may be applying additional composite material to the composite material prior to curing. As another example, an operation to be performed by the machine head may be applying a coating or surface treatment to the composite material prior to curing.

In some illustrative examples, when the material is a composite material, method 1800 cures the composite material on the tool prior to positioning the machine head (operation 1828). In some illustrative examples, curing the composite material on the tool comprises heating magnetic material that is embedded within the tool (operation 1830). In some illustrative examples, the magnetic material is heated by an external source such as an oven or an autoclave. In these illustrative examples, the magnetic material is selected to remain magnetic at curing temperatures. In some other illustrative examples, heating the composite material to cure composite material is performed at least in part using heat supplied by the magnetic material using induction.

In other illustrative examples, rather than laying down a material onto the tool, the material on the tool is a part. In these illustrative examples, method 1800 further comprises connecting the tool to the part (operation 1832). In some illustrative examples, method 1800 further comprises disconnecting the tool from the part after performing the operation (operation 1834). In some illustrative examples, method 1800 connects the tool to a second part (operation 1836). In some illustrative examples, method 1800 positions the machine head in the desired location relative to the second part using the sensor (operation 1838). In some illustrative examples, method 1800 performs the operation on the second part using the machine head starting at the desired location (operation 1840).

Optional operations 1842 through 1848 describe potential operations that can occur after operation 1812. In some illustrative examples, method 1800 positions the machine head in a second desired location relative to the material on the tool using the sensor (operation 1842). In some illustrative examples, method 1800 performs the operation on the material using the machine head starting at the second desired location (operation 1844).

In other illustrative examples, after method 1800 positions the machine head in a second desired location relative to the material on the tool using the sensor, method 1800 performs a second operation on the material using the machine head starting at the second desired location (operation 1846). In some illustrative examples of method 1800, a first portion of magnetic material associated with the desired location has a first set of characteristics, wherein positioning the machine head in the second desired location comprises locating the sensor relative to a second portion of magnetic material having a second set of characteristics in the tool, wherein the first set of characteristics is different than the second set of characteristics (operation 1848).

Figure 19:
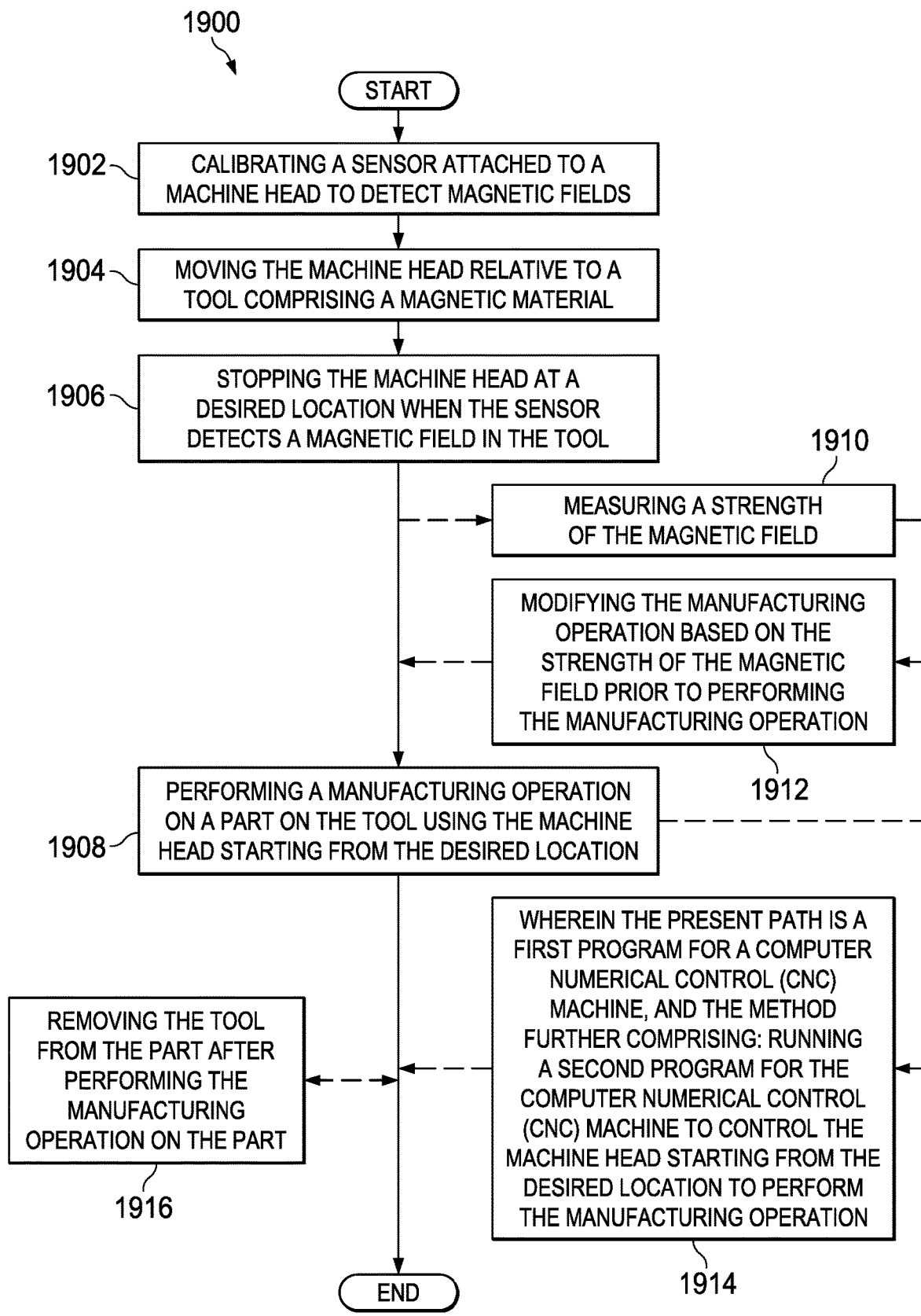
FIG. 19 is an illustration of a flowchart of a method for locating a machine head relative to a tool and performing a number of manufacturing operations in accordance with an illustrative embodiment.

Turning now to FIG. 19, an illustration of a flowchart of a method for locating a machine head relative to a tool and performing a number of manufacturing operations is depicted in accordance with an illustrative embodiment. Method 1900 may be performed using tool 200 of FIG. 2. In some illustrative examples, method 1900 may be performed using one of tool 400 of FIGS. 4-11, tool 1302 of FIGS. 13-14, tool 1500 of FIG. 15, or tool 1604 of FIG. 16. Method 1900 may be performed using machine head 202 to perform an operation on material 210 of FIG. 2.

Method 1900 calibrates a sensor attached to a machine head to detect magnetic fields (operation 1902). Method 1900 moves the machine head relative to a tool comprising a magnetic material (operation 1904). Method 1900 stops the machine head at a desired location when the sensor detects a magnetic field in the tool (operation 1906). Method 1900 performs a manufacturing operation on a part on the tool using the machine head starting from the desired location (operation 1908).

In some illustrative examples, method 1900 measures a strength of the magnetic field (operation 1910). In some illustrative examples, method 1900 modifies the manufacturing operation based on the strength of the magnetic field prior to performing the manufacturing operation (operation 1912).

In some illustrative examples, the present path is a first program for a computer numerical control (CNC) machine. In these illustrative examples, method 1900 may further comprise running a second program for the computer numerical control (CNC) machine to control the machine head starting from the desired location to perform the manufacturing operation (operation 1914). In some illustrative examples, method 1900 may further comprise removing the tool from the part after performing the manufacturing operation on the part (operation 1916).

Figure 20:
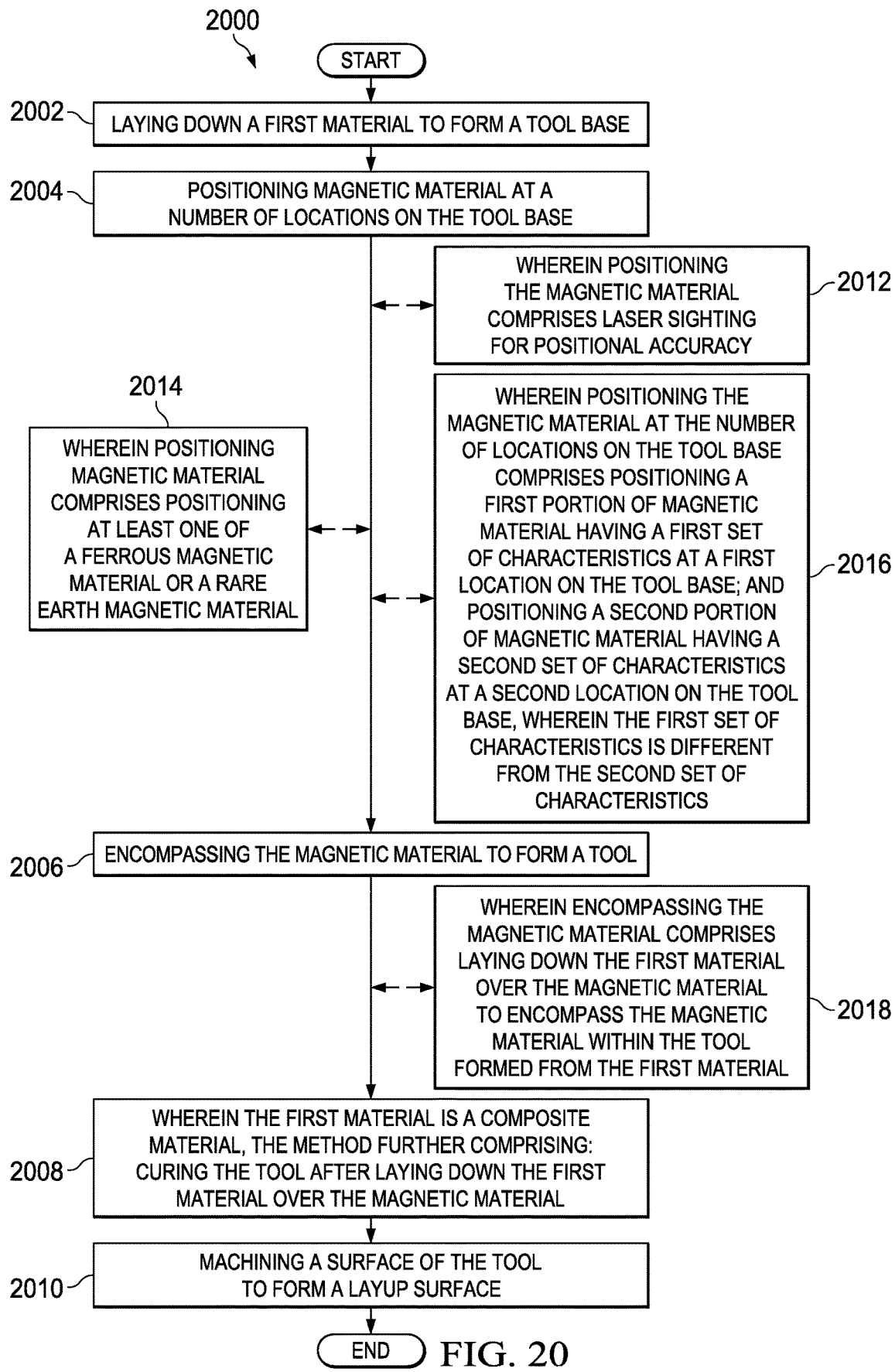
FIG. 20 is an illustration of a flowchart of a method for forming a tool having magnetic material in accordance with an illustrative embodiment.

Turning now to FIG. 20, an illustration of a flowchart of a method for forming a tool having magnetic material is depicted in accordance with an illustrative embodiment. Method 2000 may be used to form tool 200 of FIG. 2. Method 2000 may be used to form tool 400 of FIGS. 4-11. Method 2000 may be used to form tool 1302 of FIGS. 12-14.

Method 2000 lays down a first material to form a tool base (operation 2002). Method 2000 positions magnetic material at a number of locations on the tool base (operation 2004). Method 2000 encompasses the magnetic material to form a tool (operation 2006).

In some illustrative examples of method 2000, the first material is a composite material, and method 2000 cures the tool after laying down the first material over the magnetic material (operation 2008).

Method 2000 machines a surface of the tool to form a layup surface (operation 2010). Afterwards the method terminates.

In some illustrative examples, positioning the magnetic material comprises laser sighting for positional accuracy (operation 2012). In some illustrative examples, positioning magnetic material comprises positioning at least one of a ferrous magnetic material or a rare earth magnetic material (operation 2014).

In some illustrative examples of method 2000, positioning the magnetic material at the number of locations on the tool base comprises positioning a first portion of magnetic material having a first set of characteristics at a first location on the tool base; and positioning a second portion of magnetic material having a second set of characteristics at a second location on the tool base, wherein the first set of characteristics is different from the second set of characteristics (operation 2016).

In some illustrative examples of method 2000, encompassing the magnetic material comprises laying down the first material over the magnetic material to encompass the magnetic material within the tool formed from the first material (operation 2018).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. In some illustrative examples, some blocks may be removed in a flowchart or block diagram.

Figure 21:
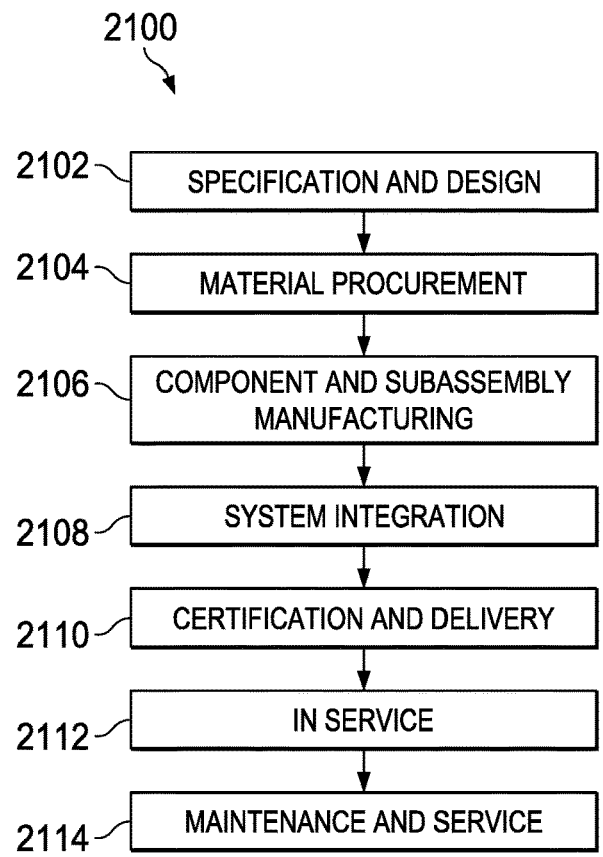
FIG. 21 is an illustration of an aircraft manufacturing and service method in the form of a block diagram in accordance with an illustrative embodiment.
Figure 22:
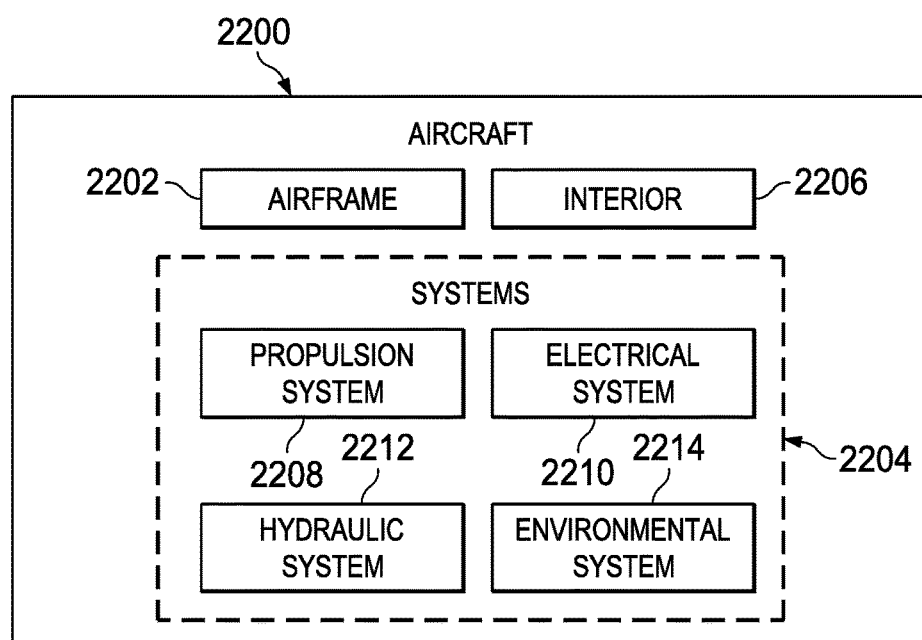
FIG. 22 is an illustration of an aircraft in the form of a block diagram in which an illustrative embodiment may be implemented.

Illustrative embodiments of the present disclosure may be described in the context of aircraft manufacturing and service method 2100 as shown in FIG. 21 and aircraft 2200 as shown in FIG. 22. Turning first to FIG. 21, an illustration of an aircraft manufacturing and service method is depicted in accordance with an illustrative embodiment. During preproduction, aircraft manufacturing and service method 2100 may include specification and design 2102 of aircraft 2200 in FIG. 22 and material procurement 2104.

During production, component and subassembly manufacturing 2106 and system integration 2108 of aircraft 2200 takes place. Thereafter, aircraft 2200 may go through certification and delivery 2110 in order to be placed in service 2112. While in service 2112 by a customer, aircraft 2200 is scheduled for routine maintenance and service 2114, which may include modification, reconfiguration, refurbishment, or other maintenance and service.

Each of the processes of aircraft manufacturing and service method 2100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 22, an illustration of an aircraft is depicted in which an illustrative embodiment may be implemented. In this example, aircraft 2200 is produced by aircraft manufacturing and service method 2100 of FIG. 21 and may include airframe 2202 with plurality of systems 2204 and interior 2206. Examples of systems 2204 include one or more of propulsion system 2208, electrical system 2210, hydraulic system 2212, and environmental system 2214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2100. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

One or more illustrative embodiments may be used during at least one of component and subassembly manufacturing 2106, system integration 2108, or maintenance and service 2114 of FIG. 21. For example, tool 200 of FIG. 2 may be used during component and subassembly manufacturing 2106 to perform manufacturing operations on material 210 of FIG. 2. Manufacturing operations may be performed on material 210 of FIG. 2 during component and subassembly manufacturing 2106 using at least one of method 1700, method 1800, or method 1900 of FIGS. 17, 18a, 18b, and 19.

Tool 200 of FIG. 2 may be used to connect components of aircraft 2200 during system integration 2108. Tool 200 of FIG. 2 may be used to form replacement components used during maintenance and service 2112 of FIG. 21. For example, tool 200 may perform operations on material 210 to form replacement components used during maintenance and service 2112 of FIG. 21. Material 210 of FIG. 2 may be at least a component of airframe 2202 or interior 2206.

In some illustrative examples, a method embeds magnets or magnetic particles into a composite tool. Utilizing the magnetic remanence post cure, these magnets and a Hall Effect Sensor on a drill bit would enable a significant reduction to computer numerical control (CNC) programming during the drilling process of composites. Magnets within a composite tool also would protect tooling and part from over drill conditions.

Finally, if trim and drill jigs were desired, these inserts could also be placed into trim/drill jigs that do not require thermal cycle of a cure. Another means to positively locate the part to the trim jig would be required but the magnetic drill finding would still be possible using a magnetic drill bit. This would be a viable alternative for parts that are cured on magnetic tool surfaces, such as Invar or Steel.

The illustrative examples provide a method of registering the locational drilling position of a hole within an associated composite laminate panel or similar placed or index to a tool surface by detection of a magnetic field where a target magnet embedded within the surface of the tool indicates the associated drilling centerline location where the location is detected by sensed locational measurement of a flux field strength.

The illustrative examples would provide a means to significantly reduce hole drilling tooling, process steps and verifications. It would also provide a means to drive a repeatable solution that does not require additional process validation throughout the lifetime of the program. In an illustrative example, an insert, such as a Magnetic and/or Fe Cup shape insert, is at a predetermined location on the tool.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for positioning a machine head, the method comprising:
   disposing a magnetic material, serving as a locational reference for identifying a desired location, in a tool;
   positioning a first surface of a material on the tool;
   positioning the machine head in the desired location relative to a second surface of the material via moving the machine head relative to the tool along a preset path and stopping the machine head in response to detecting a first portion of the magnetic material in the tool via using a sensor that is:
   connected to the machine head; and
   configured to detect the magnetic material disposed in the tool; and
   performing an operation on the material using the machine head starting the operation is started at the desired location.

2. The method of claim 1 further comprising:
   moving the tool relative to the machine head along a second preset path, wherein positioning the machine head in the desired location comprises stopping the tool from moving along the preset path in response to the sensor detecting the first portion of magnetic material in the tool.

3. The method of claim 1 further comprising:
   stopping the operation on the material based on readings from the sensor.

4. The method of claim 3, wherein the operation is drilling, and wherein stopping the operation comprises stopping the drilling when the machine head has moved one of a desired distance or a maximum distance based on a thickness of the material determined from a strength of a magnetic field detected by the sensor.

5. The method of claim 1, wherein the operation is drilling, the method further comprising:
   automatically stopping the drilling when the material has been drilled to a desired depth.

6. The method of claim 1, wherein positioning the machine head comprises locating the sensor relative to a first portion of magnetic material in the tool.

7. The method of claim 1, wherein the material is a composite material, the method further comprising:
   laying down the composite material on the tool; and
   curing the composite material on the tool prior to positioning the machine head.

8. The method of claim 7, wherein curing the composite material on the tool comprises providing a magnetic field via heating the magnetic material that is embedded within the tool.

9. The method of claim 1 further comprising:
   detecting the magnetic material by the sensor utilizing a Hall Effect sensor.

10. The method of claim 1 further comprising:
    removing the material from the tool after performing the operation;
    positioning a second material on the tool;
    positioning the machine head in the desired location relative to the second material on the tool using the sensor; and
    performing the operation on the second material using the machine head starting at the desired location.

11. The method of claim 1 further comprising:
    positioning the machine head in a second desired location relative to the material on the tool using the sensor; and
    performing the operation on the material using the machine head starting at the second desired location.

12. The method of claim 1 further comprising:
    positioning the machine head in a second desired location relative to the material on the tool using the sensor; and
    performing a second operation on the material using the machine head starting at the second desired location.

13. The method of claim 12, wherein a first portion of magnetic material associated with the desired location has a first set of characteristics, wherein positioning the machine head in the second desired location comprises locating the sensor relative to a second portion of magnetic material having a second set of characteristics in the tool, wherein the first set of characteristics is different than the second set of characteristics.

14. The method of claim 1, wherein the material on the tool is a part, the method further comprising:
    connecting the tool to the part.

15. The method of claim 14 further comprising:
    disconnecting the tool from the part after performing the operation;
    connecting the tool to a second part;
    positioning the machine head in the desired location relative to the second part using the sensor; and
    performing the operation on the second part using the machine head starting at the desired location.

16. A system configured to position a machine head, such that the system comprises:
    a magnetic material positioned in a tool as a locational reference;

a device to secure a material to the tool;
the machine head configured to perform an operation at a position identified relative to the magnetic material in the tool, such that an operational component connects to the machine head to perform the operation; and
a sensor connected to the machine head and configured to detect, through the material, the magnetic material in the tool; and
a controller configured to:
   locate, based upon a detection by the sensor, the machine head in a desired location relative to the material on the tool;
   move the machine head relative to the tool;
   stop the machine head at the position in response a detection by the sensor of a first portion of magnetic material in the tool.

17. The system of claim 16, wherein the controller is configured to instruct the machine head to perform the operation on the material starting at the position.

18. A method for positioning a machine head relative to a material comprising a surface lacking a reference feature, the method comprising:
using a magnetic material as a locational reference relative to the surface of the material lacking the reference feature by providing a tool, holding the material lacking the reference feature, with the magnetic material disposed therein;
positioning the material lacking the reference feature and being operated on by the machine head by:
   positioning the magnetic material in the tool with a second magnetic material disposed therein; and
   connecting the material lacking the reference feature to the tool;
positioning the machine head in a desired location on the surface of the material relative to the magnetic material using a sensor, on the machine head, configured to detect the magnetic material;
performing an operation on the material lacking the reference feature using the machine head via starting the operation at the desired location on the surface of the material via sensing the magnetic material disposed in the tool;
moving the machine head relative to the tool along a preset path, wherein positioning the machine head in the desired location on the surface of the material comprises stopping the machine head from moving along the preset path in response to the sensor detecting a first portion of magnetic material in the tool;
stopping, using readings from the sensor, the operation on the material lacking the reference feature using readings from the sensor;
positioning, using the sensor and the magnetic material in the tool, the machine head in a second desired location relative to the material lacking the reference feature on the tool; and
performing, using the machine head starting at the second desired location, a second operation on the material lacking the reference feature.

19. The method of claim 18, wherein positioning the machine head in the desired location on the surface of the material comprises stopping the machine head from moving along the preset path.

20. The method of claim 19, wherein the operation is drilling.

21. The method of claim 20, wherein stopping the operation comprises at least one of stopping the drilling when the machine head has moved a desired distance, or stopping the drilling when the machine head has moved a maximum distance based on a thickness of the material determined from a strength of a magnetic field detected by the sensor.

22. The method of claim 18, wherein the material is a composite material.

23. The method of claim 22, further comprising:
curing the composite material on the tool prior to positioning the machine head.

24. The method of claim 23, wherein curing the composite material on the tool comprises providing a magnetic field via heating the magnetic material that is embedded within the tool.

25. A method of controlling a depth of movement of a machine head, the method comprising:
disposing a magnetic material as a locational reference relative to a first surface of a material to be machined by positioning the magnetic material in a tool with a second magnetic material disposed therein;
laying a second surface of the material to be machined on-to the tool;
positioning the machine head in a desired location on the first surface of the material to be machined relative to the magnetic material using a sensor, on the machine head, configured to detect the magnetic material;
performing an operation on the material to be machined using the machine head via starting the operation at the desired location via sensing the magnetic material disposed in the tool;
moving the tool relative to the machine head along a preset path in response to the sensor detecting a first portion of the magnetic material in the tool; and
stopping, using readings from the sensor, the operation on the material.

26. The method of claim 25, wherein the operation is drilling.

27. The method of claim 26, wherein stopping the operation comprises stopping the drilling when the machine head has moved a desired distance.

28. The method of claim 26, wherein stopping the operation comprises stopping the drilling when the machine head has moved a maximum distance based on a thickness of the material to be machined determined from a strength of a magnetic field detected by the sensor.

29. The method of claim 25, wherein the material is a composite material.

30. The method of claim 29, further comprising:
laying down the composite material on the tool.

31. The method of claim 30, further comprising:
curing the composite material on the tool prior to positioning the machine head.

32. The method of claim 31, wherein curing the composite material on the tool comprises providing a magnetic field via heating the magnetic material that is embedded within the tool.

33. A method for foregoing a registration of a machine head to a material being operated on by the machine head, the method comprising:
disposing a magnetic material as a locational reference relative to a first surface of the material being operated on by the machine head by positioning the magnetic material in a tool with a second magnetic material disposed therein;
placing, against the tool, a second surface of the material being operated on by the machine head;
positioning the machine head in a desired location on the first surface of the material being operated on by the machine head relative to the magnetic material using a sensor, on the machine head, configured to detect the magnetic material;

performing an operation on the material being operated on by the machine head using the machine head via starting the operation at the desired location via sensing the magnetic material disposed in the tool; and moving the machine head relative to the tool along a preset path, wherein positioning the machine head in the desired location comprises stopping the machine head from moving along the preset path in response to the sensor detecting a first portion of magnetic material in the tool;

stopping the operation on the material using readings from the sensor;

positioning the machine head in a second desired location relative to the material on the tool using the sensor and the magnetic material in the tool; and performing a second operation on the material using the machine head starting at the second desired location.

* * * * *